United States Patent
Kanamarlapudi et al.

(10) Patent No.: US 12,395,277 B2
(45) Date of Patent: Aug. 19, 2025

(54) APPLICATION DATA UNIT FORWARD ERROR CORRECTION ADAPTATION

(71) Applicant: QUALCOMM Incorporated, San Diego, CA (US)

(72) Inventors: Sitaramanjaneyulu Kanamarlapudi, San Diego, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 17/652,860

(22) Filed: Feb. 28, 2022

(65) Prior Publication Data

US 2023/0275700 A1    Aug. 31, 2023

(51) Int. Cl.
*H04L 1/1812*    (2023.01)
*H04L 1/00*    (2006.01)

(52) U.S. Cl.
CPC ............ *H04L 1/1812* (2013.01); *H04L 1/004* (2013.01)

(58) Field of Classification Search
CPC ...................................................... H04L 1/1812
See application file for complete search history.

(56) References Cited

U.S. PATENT DOCUMENTS

2021/0328711 A1    10/2021  Zhou et al.
2023/0155725 A1*   5/2023   Wu ....................... H04L 1/0045
                                              370/328

FOREIGN PATENT DOCUMENTS

WO    WO-2021243535 A1 *  12/2021  ........... H04L 1/0045
WO    WO-2021244380 A1    12/2021

OTHER PUBLICATIONS

International Search Report and Written Opinion—PCT/US2023/063025—ISA/EPO—Jul. 21, 2023.
Nokia, et al., "MBS Reliability", 3GPP TSG-RAN WG2 Meeting #113bis Electronic, R2-2102945, 3rd Generation Partnership Project, Mobile Competence Centre, 650, Route Des Lucioles, F-06921 Sophia-Antipolis Cedex, France, vol. RAN WG2, No. Electronic; Apr. 12, 2021-Apr. 20, 2021, Apr. 2, 2021, 4 Pages, XP052174514, The whole document.
LG Electronics Inc, et al., "Redundant Retransmission in PDCP Duplication", 3GPP TSG-RAN WG2 Meeting #108, R2-1914899, 3rd Generation Partnership Project, Mobile Competence Centre, 650, Route Des Lucioles, F-06921 Sophia-Antipolis Cedex, France, vol. RAN WG2, No. Reno, NV, USA, Nov. 18, 2019-Nov. 22, 2019, Nov. 8, 2019, XP051816840, pp. 1-2.
Partial International Search Report—PCT/US2023/063025—ISA/EPO—May 30, 2023.

* cited by examiner

*Primary Examiner* — Abdeltif Ajid
(74) *Attorney, Agent, or Firm* — QUALCOMM Incorporated

(57) ABSTRACT

Various aspects of the present disclosure generally relate to wireless communication. In some aspects, a user equipment (UE) may obtain forward error correction (FEC) information associated with an application data unit (ADU). The UE may adjust a packet data convergence protocol (PDCP) characteristic, a radio link control (RLC) characteristic, or a physical layer hybrid automatic repeat request (HARQ) characteristic for transmitting a packet associated with the ADU based at least in part on the FEC information. Numerous other aspects are described.

30 Claims, 11 Drawing Sheets

APPLICATION DATA UNIT FORWARD ERROR CORRECTION ADAPTATION

FIELD OF THE DISCLOSURE

Aspects of the present disclosure generally relate to wireless communication and to techniques and apparatuses for application data unit forward error correction adaptation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining forward error correction (FEC) information associated with an application data unit (ADU). The method may include adjusting a packet data convergence protocol (PDCP) characteristic, a radio link control (RLC) characteristic, or a physical layer hybrid automatic repeat request (HARQ) characteristic for transmitting a packet associated with the ADU based at least in part on the FEC information.

Some aspects described herein relate to a method of wireless communication performed by a UE. The method may include obtaining PDCP information, RLC information, or physical layer HARQ information. The method may include applying FEC to an ADU based at least in part on the PDCP information, the RLC information, or the physical layer HARQ information.

Some aspects described herein relate to an apparatus for wireless communication performed by a UE. The apparatus may include a memory and one or more processors, coupled to the memory. The one or more processors may be configured to obtain FEC information associated with an ADU. The one or more processors may be configured to adjust a PDCP characteristic, an RLC characteristic, or a physical layer HARQ characteristic for transmitting a packet associated with the ADU based at least in part on the FEC information.

Some aspects described herein relate to an apparatus for wireless communication performed by a base station. The apparatus may include a memory and one or more processors, coupled to the memory. The one or more processors may be configured to obtain PDCP information, RLC information, or physical layer HARQ information. The one or more processors may be configured to apply FEC to an ADU based at least in part on the PDCP information, the RLC information, or the physical layer HARQ information.

Some aspects described herein relate to a non-transitory computer-readable medium that stores a set of instructions for wireless communication by a UE. The set of instructions, when executed by one or more processors of the UE, may cause the UE to obtain FEC information associated with an ADU. The set of instructions, when executed by one or more processors of the UE, may cause the UE to adjust a PDCP characteristic, an RLC characteristic, or a physical layer HARQ characteristic for transmitting a packet associated with the ADU based at least in part on the FEC information.

Some aspects described herein relate to a non-transitory computer-readable medium that stores a set of instructions for wireless communication by a UE. The set of instructions, when executed by one or more processors of the UE, may cause the UE to obtain PDCP information, RLC information, or physical layer HARQ information. The set of instructions, when executed by one or more processors of the UE, may cause the UE to apply FEC to an ADU based at least in part on the PDCP information, the RLC information, or the physical layer HARQ information.

Some aspects described herein relate to an apparatus for wireless communication. The apparatus may include means for obtaining FEC information associated with an ADU. The apparatus may include means for adjusting a PDCP characteristic, an RLC characteristic, or a physical layer HARQ characteristic for transmitting a packet associated with the ADU based at least in part on the FEC information.

Some aspects described herein relate to an apparatus for wireless communication. The apparatus may include means for obtaining PDCP information, RLC information, or physical layer HARQ information. The apparatus may include means for applying FEC to an ADU based at least in part on the PDCP information, the RLC information, or the physical layer HARQ information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
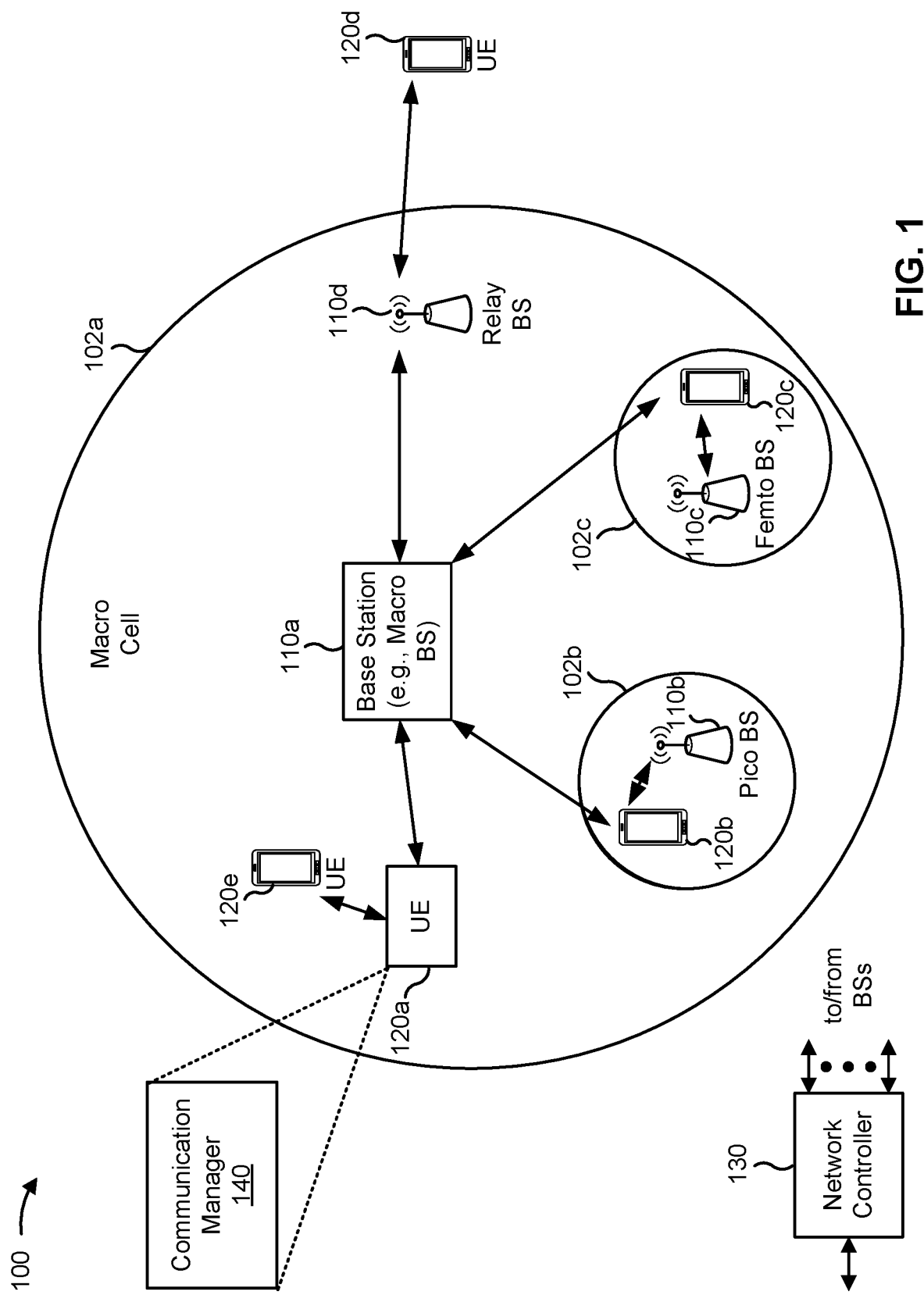
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain forward error correction (FEC) information associated with an application data unit (ADU); and adjust a packet data convergence protocol (PDCP) characteristic, a radio link control (RLC) characteristic, or a physical layer hybrid automatic repeat request (HARQ) characteristic for transmitting a packet associated with the ADU based at least in part on the FEC information. Additionally, or alternatively, the communication manager 140 may perform one or more other operations described herein.

In some aspects, the communication manager 140 may obtain PDCP information, RLC information, or physical layer HARQ information; and apply FEC to an ADU based at least in part on the PDCP information, the RLC information, or the physical layer HARQ information. Additionally, or alternatively, the communication manager 140 may perform one or more other operations described herein.

As indicated above, FIG. 1 is provided as an example. Other examples may differ from what is described with regard to FIG. 1.

Figure 2:
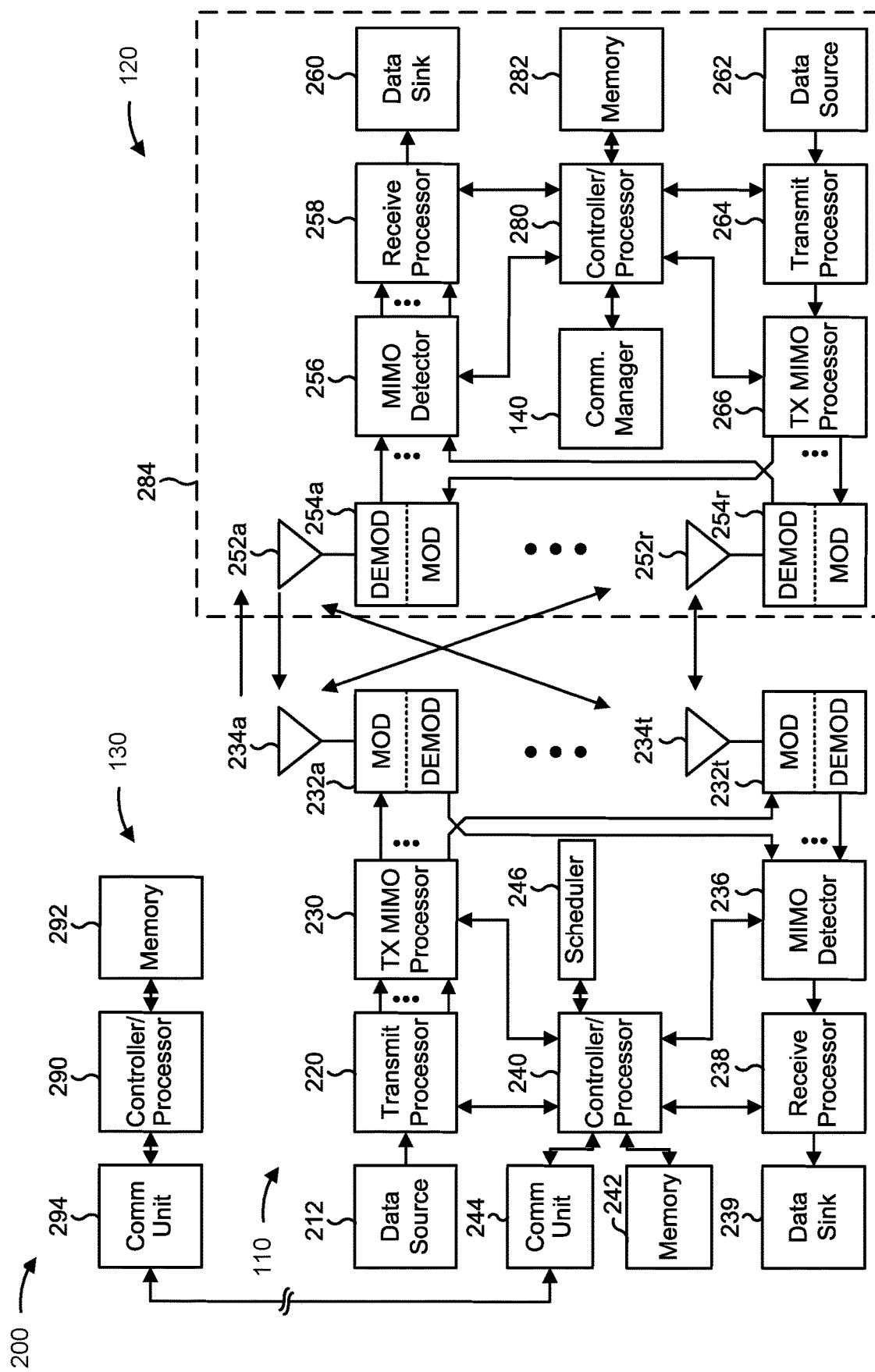
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with ADU FEC adaptation, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for obtaining FEC information associated with an ADU; and/or means for adjusting a PDCP characteristic, an RLC characteristic, or a physical layer HARQ characteristic for transmitting a packet associated with the ADU based at least in part on the FEC information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for obtaining PDCP information, RLC information, or physical layer HARQ information; and/or means for applying FEC to an ADU based at least in part on the PDCP information, the RLC information, or the physical layer HARQ information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
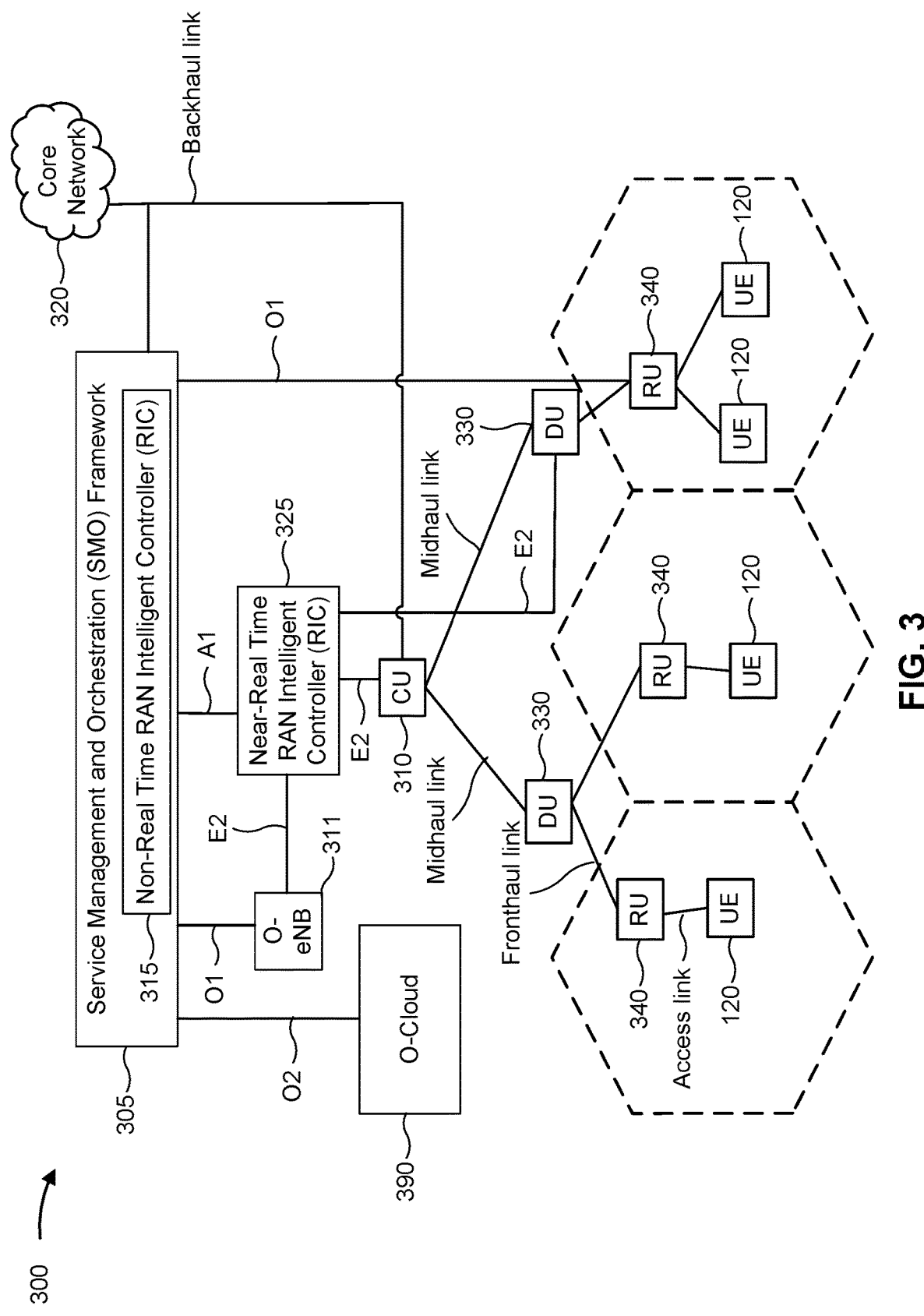
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), PDCP, service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of an RLC layer, a medium access control (MAC) layer, and one or more high physical (PHY) layers (such as modules for FEC encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
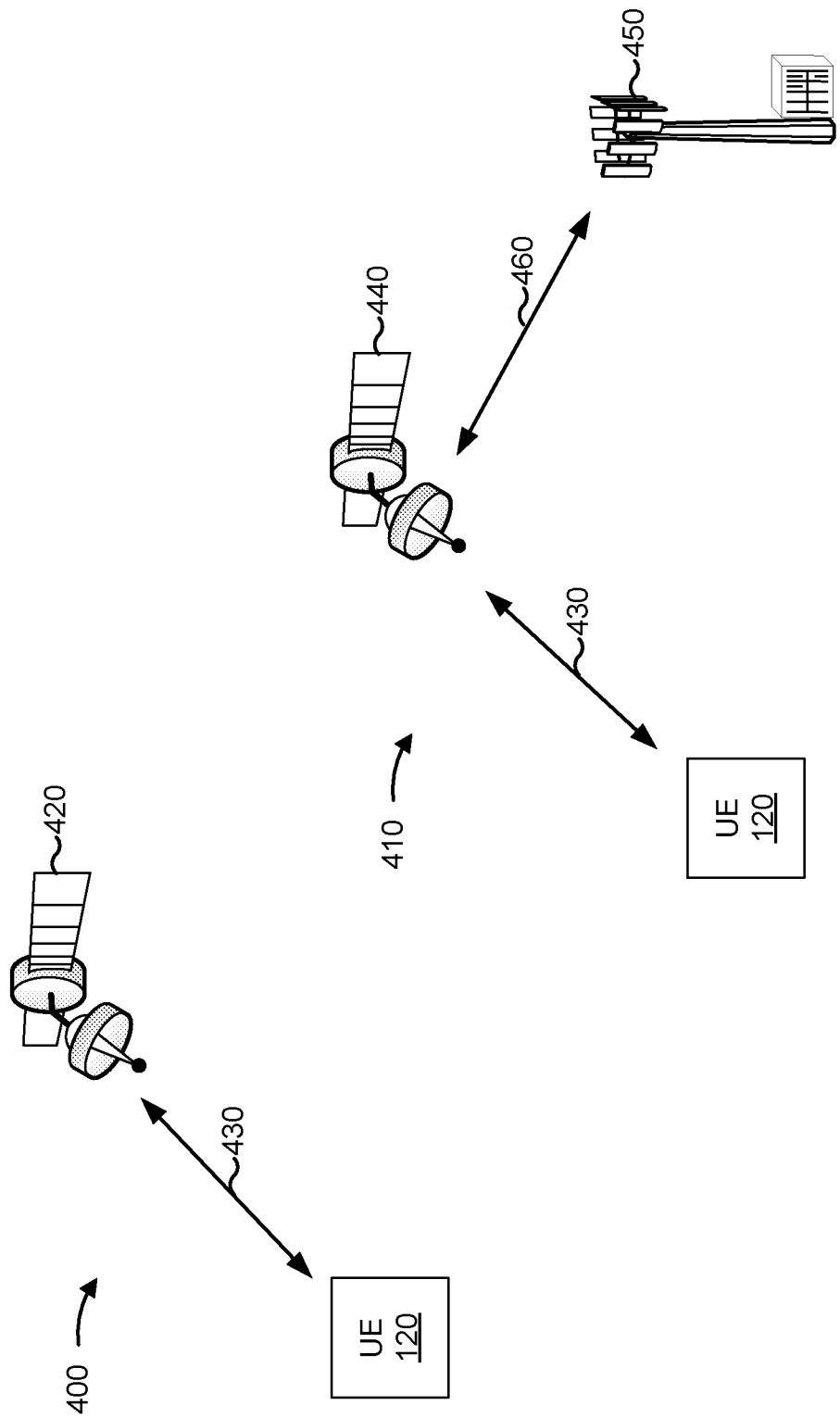
FIG. 4 is a diagram illustrating an example of a regenerative satellite deployment and a transparent satellite deployment in a non-terrestrial network, in accordance with the present disclosure.

FIG. 4 is a diagram illustrating an example 400 of a regenerative satellite deployment and an example 410 of a transparent satellite deployment in a non-terrestrial network (NTN).

Example 400 shows a regenerative satellite deployment. In example 400, a UE 120 is served by a satellite 420 via a service link 430. For example, the satellite 420 may include a BS 110 (e.g., BS 110a) or a gNB. In some aspects, the satellite 420 may be referred to as a non-terrestrial base station, a regenerative repeater, or an on-board processing repeater. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from gateway 450 via a feeder link 460. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 430 to a frequency of the uplink radio frequency transmission on the feeder link 460, and may amplify and/or filter the uplink radio frequency transmission. In some aspects, the UEs 120 shown in example 400 and example 410 may be associated with a Global Navigation Satellite System (GNSS) capability or a Global Positioning System (GPS) capability, though not all UEs have such capabilities. The satellite 440 may provide a cell that covers the UE 120.

The service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). An uplink of the service link 430 may be indicated by reference number 430-U (not shown in FIG. 4) and a downlink of the service link 430 may be indicated by reference number 430-D (not shown in FIG. 4). Similarly, an uplink of the feeder link 460 may be indicated by reference number 460-U (not shown in FIG. 4) and a downlink of the feeder link 460 may be indicated by reference number 460-D (not shown in FIG. 4).

The feeder link 460 and the service link 430 may each experience Doppler effects due to the movement of the satellites 420 and 440, and potentially movement of a UE 120. These Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

As described herein, FEC may be applied to one or more packets for extended reality (XR). In some aspects, the XR may be implemented as part of the NTN network described above.

As indicated above, FIG. 4 is provided as an example. Other examples may differ from what is described with regard to FIG. 4.

Figure 5:
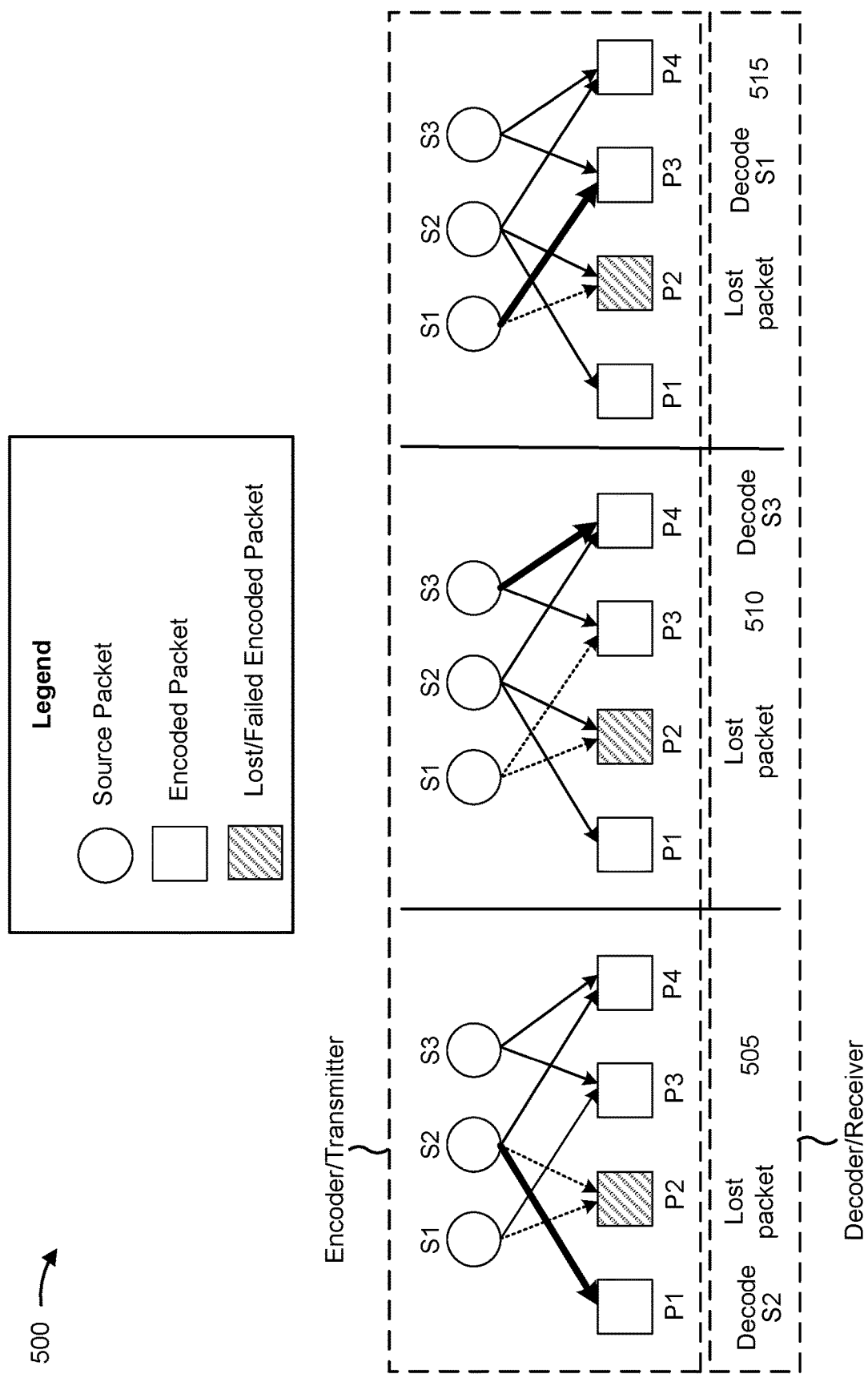
FIG. 5 is a diagram illustrating an example of network coding, in accordance with the present disclosure.

FIG. 5 is a diagram illustrating an example 500 of network coding, in accordance with the present disclosure. Network coding may also be referred to as erasure coding and recovery. As shown in FIG. 5, an encoder (or transmitter) may communicate with a decoder (or receiver). The encoder is sometimes also referred to as a transmitter, an encoder node, or a transmitter node. The encoder may include a UE 120, a base station 110, and/or an integrated access and backhaul (IAB) device, among other examples. An IAB device may include an IAB donor (e.g., a central unit (CU) of an IAB donor and/or a distributed unit (DU) of an IAB donor) or an IAB node (e.g., a DU of an IAB node and/or a mobile termination (MT) of an IAB node). The decoder is sometimes also referred to as a receiver, a decoder node, or a receiver node. The decoder may include a UE 120, a base station 110, and/or an IAB device, among other examples.

As shown in FIG. 5, an encoder (or transmitter) may encode data, shown as a set of source packets or original packets (p1, p2, and p3), into a set of encoded packets using network coding. While FIG. 5 uses "packets" as example data, it is understood that the data may include any type of communication (e.g., transport blocks), and is not limited to packets. An encoded packet may be the same as a source packet, may be a redundancy version of a source packet, may include a combination of multiple source packets (e.g., a subset of the source packets), and/or may include a redundancy version of the combination. The number of encoded packets may be the same as or different than the number of source packets. In some aspects, the number of encoded packets may be unlimited (e.g., the encoder may generate any number of encoded packets), such as when using a rateless network coding scheme. In example 500, the encoder encodes K source packets (where K=3) into N encoded packets (where N=4). The encoder transmits the encoded packets to a decoder (or receiver). The decoder uses network coding to decode the encoded packets and recover the source packets. As used herein, network coding may be performed using any type of network coding scheme, such as fountain coding, linear network coding, random linear network coding, Luby transform (LT) network coding, and/or Raptor network coding.

In example 500, the encoder encodes three source packets (S1, S2, and S3) into four encoded packets: P1 (e.g., that carries S2), P2 (e.g., that carries S1+S2), P3 (e.g., that carries S1+S3), and P4 (e.g., that carries S2+S3). The encoder may transmit the four encoded packets to the decoder. In this example, the packet P2 (carrying S1+S2) is not successfully received by the decoder. In a first operation 505, the decoder decodes the packet P1 (carrying S2). In a second operation 510, the decoder obtains S3 from the packet P4 (carrying S2+S3) because the decoder has already decoded S2 and can use combining to obtain S3 from S2+S3. In a third operation 515, the decoder obtains S1 from the packet P3 (carrying S1+S3) because the decoder has already decoded S3 and can use combining to obtain S1 from S1+S3. In some aspects, an encoded packet may include an indication (e.g., in a header of the encoded packet) that indicates the source packet(s) that are included in the encoded packet. Thus, the decoder can obtain S1, S2, and S3 despite P2 failing, and using less overhead than PDCP duplication. For example, PDCP duplication may duplicate all of the source packets for a total of six transmissions, while the example network coding shown in FIG. 5 uses four transmissions.

In some cases, the encoder may continue to transmit encoded packets (e.g., the same combination of encoded packets or different combinations of encoded packets) to the decoder until the encoder receives a notification from the decoder. For example, the decoder may successfully receive the source packets or may abort decoding, which may trigger the decoder to send a notification to the encoder. The notification may include, for example, an acknowledgement (ACK) and/or a stop message (STOP). In some cases, the decoder may transmit an ACK for each original packet that is successfully received. Additionally, or alternatively, the decoder may transmit an ACK upon successful reception of all of the source packets. Upon receiving the notification, the encoder may encode additional data (e.g., a new set of source packets, such as S4, S5, and S6), and may transmit encoded packets to the decoder, in a similar manner as described above, until all of the data has been transmitted and/or successfully received. Alternatively, to conserve network resources and reduce overhead, the encoder may not transmit an ACK or a negative acknowledgement (NACK) for received packets.

In some cases, such as when using a Raptor network coding scheme, the encoder may perform inner coding, or precoding, to generate a set of intermediate packets, that include a set of redundant packets, from the source packets. A redundant packet may be a copy of a source packet or a redundancy version of a source packet. In some aspects, a redundant packet may be a low density parity check (LDPC) packet. For example, the encoder may apply inner coding to generate K' intermediate packets (e.g., original plus redundant packets from K source packets). The encoder may then perform outer coding (e.g., fountain coding and/or LT network coding) to generate N encoded packets from the K' intermediate packets, in a similar manner as described above. As a result, the encoding and/or decoding complexity of the Raptor network coding scheme may be linear. The encoded packets may include a set of systemic packets and a set of repair packets. In some aspects, the decoder may choose to not decode a packet included in the set of systematic symbols that has a high decoding complexity (e.g., is associated with a high encoding degree and/or is associated with a high quantity of source packets). The decoder may recover the source packets associated with the packet that is not decoded from one or more packets included in the set of repair packets. The one or more packets included in the set of repair packets may be associated with a lower decoding complexity. As a result, the decoding complexity may be reduced.

In some examples, the network coding may be viewed as a linear system (e.g., over a Galois field) with three variables and four linearly independent constraints. For example, the three variables may correspond to the source packets (e.g., s1, s2, and s3) and the four linearly independent constraints may correspond to the four encoded packets. Using the linear system, any of the three variables that have been subject to an erasure (e.g., transmission error) may be recovered based at least in part on a portion of the three original packets and based at least in part on a portion of the four encoded packets. Network coding (e.g., erasure coding and recovery) may enable a UE to recover a communication that has been erased (e.g., lost or corrupted) during transmission. The recovery of the erased communication, without requiring retransmission by the network node, may reduce the overall number of retransmissions by the network node and may reduce the overall load on the network.

As described in more detail below, the UE 120 may be configured to determine FEC information for packet recovery using network coding.

As indicated above, FIG. 5 is provided as an example. Other examples may differ from what is described with respect to FIG. 5.

Figure 6:
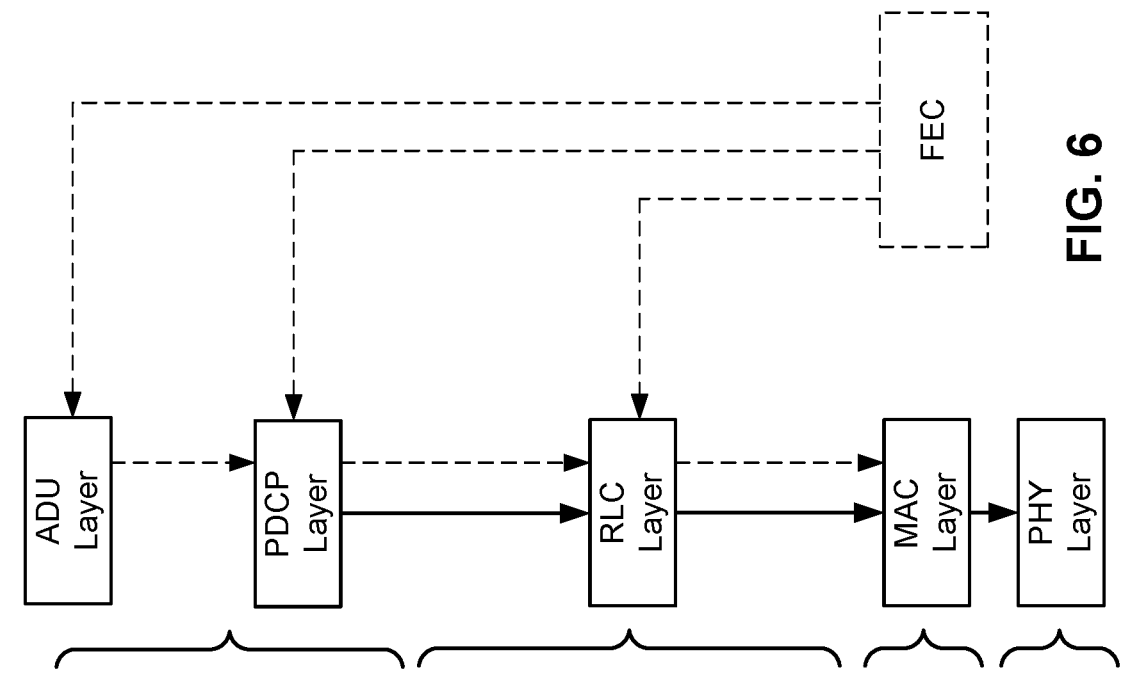
FIG. 6 is a diagram illustrating an example of a network coding protocol stack, in accordance with the present disclosure.
Figure 6:
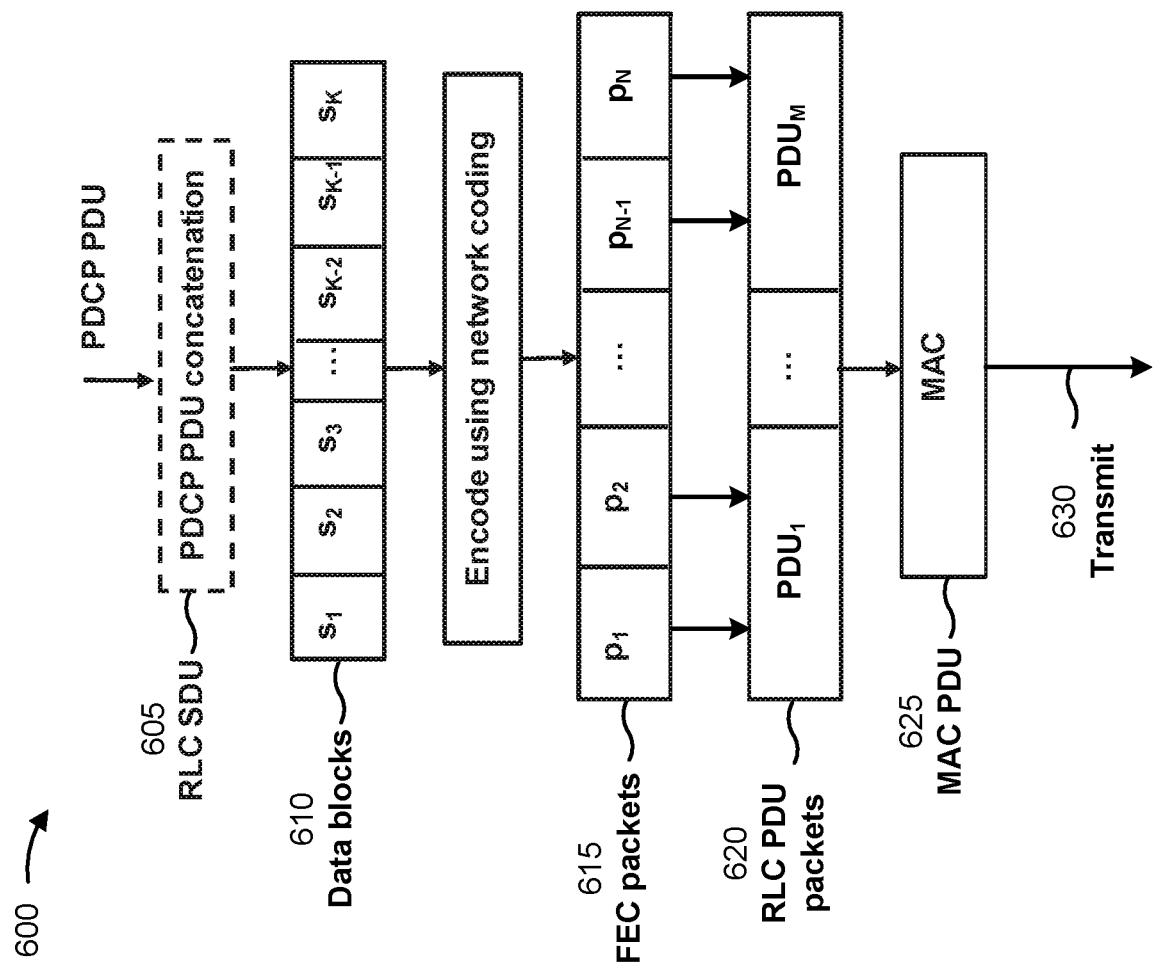

FIG. 6 is a diagram illustrating an example 600 of a network coding protocol stack, in accordance with the present disclosure. The operations described in connection with FIG. 6 may be performed by a transmitter (also referred to as an encoder), such as a UE 120 or a base station 110.

As shown by reference number 605, a transmitter may generate an RLC service data unit (SDU) from one or more PDCP protocol data units (PDUs). In some aspects, a single PDCP PDU is included in an RLC SDU. In some aspects, multiple PDCP PDUs are included in an RLC SDU (e.g., by concatenating multiple PDCP PDUs). In some aspects, the transmitter determines whether to include a single PDCP PDU in a single RLC SDU or whether to concatenate multiple PDCP PDUs in a single RLC SDU based at least in part on a size of the PDCP PDU. For example, if the size of the PDCP PDU satisfies a threshold (e.g., is greater than or equal to the threshold), then the encoder may include only the PDCP PDU (e.g., a single PDCP PDU) in a single RLC SDU. If the size of the PDCP PDU does not satisfy a threshold (e.g., is less than or equal to the threshold), then the encoder may concatenate multiple PDCP PDUs (e.g., a set of PDCP PDUs with a total size that is less than or equal to the threshold) into a single RLC SDU.

As shown by reference number 610, the transmitter may divide the RLC SDU into a plurality of data blocks. For example, the transmitter may divide the RLC SDU into K data blocks, shown as $s_1$ through $s_K$, based at least in part on the set of network coding parameters. In some aspects, the set of network coding parameters specify the value of K for a particular set of sub-parameters, such as a payload size for the RLC SDU and/or a size of a sequence number field in an RLC PDU header for the RLC SDU. In some aspects, the encoder determines the value of K for a set of sub-parameters.

In some aspects, the operations associated with reference numbers 605 and 610 may be performed at the PDCP layer of the transmitter. The PDCP layer may provide the data blocks to the RLC layer of the transmitter. As shown by reference number 615, the transmitter may encode the K data blocks into N FEC packets using network coding. For example, the transmitter may encode the K data blocks into the N FEC packets, shown as $p_1$ through $p_N$, based at least in part on a rateless code, such as a network code, a fountain code, a Luby transform (LT) code, and/or a Raptor code. In particular, the transmitter may encode the K data blocks into the N FEC packets such that the N FEC packets include additional information or bits for purposes of forward error correction. This permits FEC packets to be recovered by a receiver, for example, if the quantity of received FEC packets is larger than the quantity of K data blocks regardless of which FEC packets are received.

In some aspects, the number of RLC packets (e.g., the value of N) is based at least in part on the set of network coding parameters. In some aspects, the set of network coding parameters specifies the value of N for a particular set of sub-parameters, a delay budget for the RLC SDU, available encoding and decoding computation resources of the transmitter, the value of K (e.g., the quantity of data blocks), a target error probability for one or more RLC PDU packets for the N FEC, channel conditions for transmission of the RLC PDU packets(s), and/or the type of network code that is to be used to encode the K data blocks into the N FEC packets, among other examples. In some aspects, the transmitter may determine the value of N for a set of sub-parameters.

As shown by reference number 620, the transmitter may map the N FEC packets to a corresponding M RLC PDU packets. For example, the transmitter may map N FEC packets to M RLC PDU packets, shown as $PDU_1$ through $PDU_M$, such that each RLC PDU includes a plurality of FEC packets (e.g., two FEC packets per RLC PDU packet, four FEC packets per RLC PDU packet, or another quantity of FEC packets per RLC PDU packet). In some aspects, the operations associated with reference numbers 615 and 620 are performed at the RLC layer of the transmitter. The RLC layer may receive an indication of the set of network coding parameters from the RRC layer and may perform the operations associated with reference numbers 615 and 620 based at least in part on the set of network coding parameters.

The RLC layer may provide the M RLC PDU packets to the MAC layer of the transmitter. As shown by reference number 625, the transmitter may generate a MAC PDU for the M RLC PDU packets. In some aspects, the MAC PDU includes an RLC PDU header or a MAC PDU header, which may include information associated with each of the MRLC PDUs. For example, the RLC PDU header or MAC PDU header may include a sequence number field, which may indicate a sequence number associated with each of the M RLC PDUs. In some aspects, the operations associated with reference number 625 are performed at the MAC layer of the transmitter.

The MAC layer of the transmitter may provide the MAC PDU to the physical (PHY) layer of the transmitter. As shown by reference number 630, the encoder may transmit the Ml RLC PDU packets (e.g., in the MAC PDU) to a receiver (also referred to as a decoder), such as a UE 120 or a base station 110. In some aspects, the PHY layer of the transmitter may transmit the MRLC PDU packets (e.g., in the MAC PDU) over a wireless physical channel, such as a physical downlink shared channel (PDSCH), a physical downlink control channel (PDCCH), a physical uplink shared channel (PUSCH), a physical uplink control channel (PDCCH), a physical sidelink control channel (PSCCH), and/or a physical sidelink shared channel (PSSCH).

As described herein, FEC is an error correction technique that is used to detect and correct a limited number of errors in transmitted data without the need for retransmission. In this method, the transmitter (e.g., a UE) may send a redundant error-correcting code along with the data frame. The receiver (e.g., a network node) may perform necessary checks based at least in part on the additional redundant bits. If the receiver determines that the data is free from errors, the receiver may an execute error-correcting code that generates the actual frame, and may remove the redundant bits before passing the message to the upper layers. In some cases, because FEC does not require handshaking between the transmitter and the receiver, it can be used for broadcasting of data to many destinations simultaneously from a single source. Additionally, FEC can save bandwidth that may be required for retransmission. However, in some cases (e.g., if there are too many errors), the frames may need to be retransmitted.

In some cases, error correcting codes for FEC corrections can be broadly categorized into two types, namely, block codes and convolution codes. With block codes, the message may be divided into fixed-sized blocks of bits to which redundant bits are added for error correction. In contrast, with convolutional codes, the message may be comprised of data streams of arbitrary length and parity symbols may be generated by the sliding application of a Boolean function to the data stream.

In some cases, the FEC and network coding may occur at various layers. For example, as described above, FEC and network coding may be applied to the packet at the PDCP layer. In this case, the PDCP layer can add network coding to the packet and generate multiple packets out of the PDCP SDU (ADU). In some cases, FEC and network coding may be applied to the packet at the ADU layer. For example, the ADU layer may generate an FEC encoded packet, and may transmit the FEC encoded packet to the PDCP layer. In this case, the network coded packet may be received by the PDCP layer as a PDCP SDU. In some cases, FEC and network coding may be applied to the packet at the RLC layer. For example, the RLC layer may receive the PDCP PDU (e.g., from the PDCP layer) and may perform the network coding on the PDCP PDU. Numerous other examples may be considered. For example, FEC and network coding may be applied to a single packet at more than one layer (e.g., at the ADU layer and at the PDCP layer).

As described in more detail below, the UE 120 may be configured to determine FEC information for packet recovery using network coding.

As indicated above, FIG. 6 is provided as an example. Other examples may differ from what is described with respect to FIG. 6.

Figure 7:
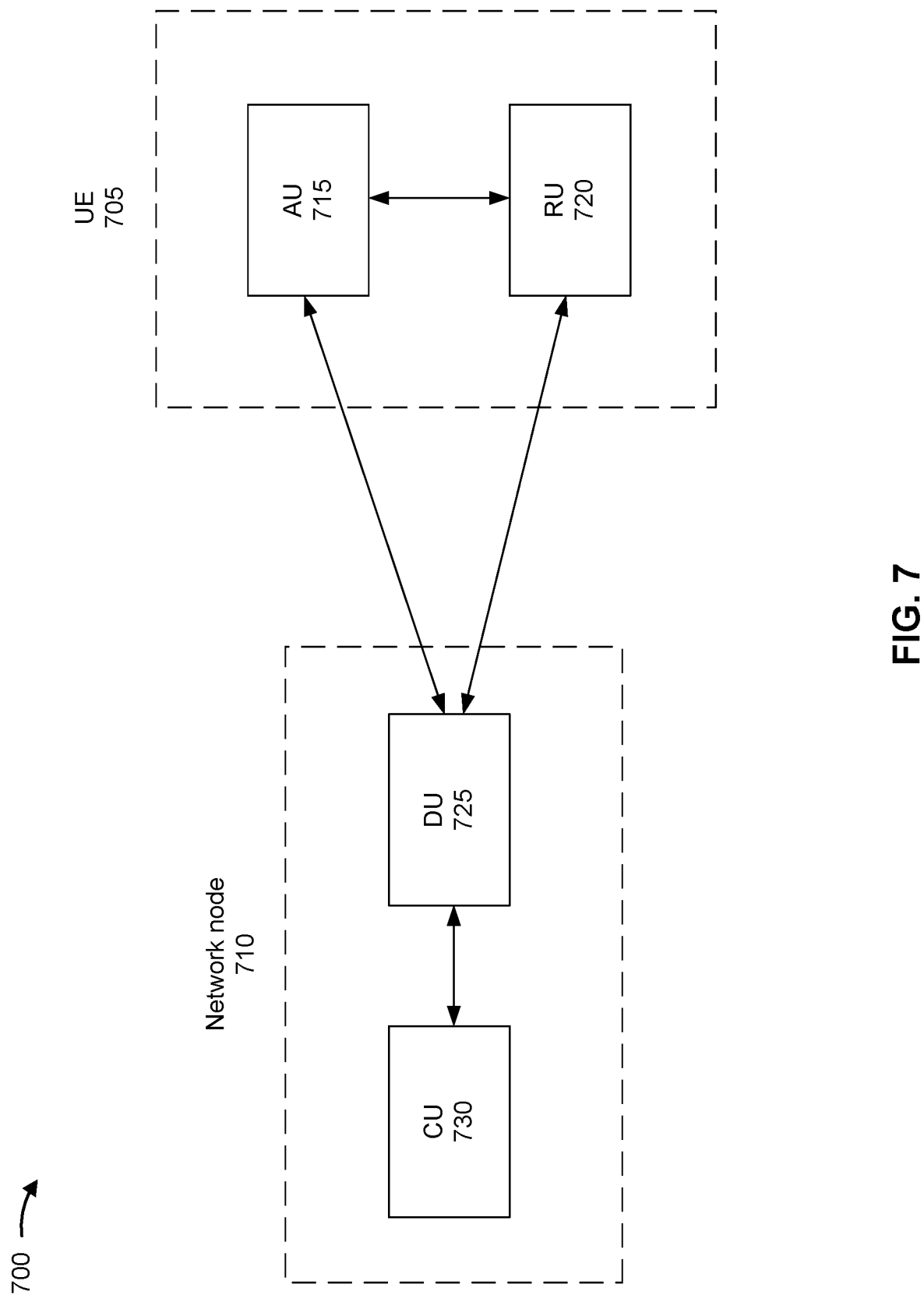
FIG. 7 is a diagram illustrating an example of an extended reality architecture, in accordance with the present disclosure.

FIG. 7 is a diagram illustrating an example 700 of an extended reality (XR) architecture, in accordance with the present disclosure. The XR architecture may include a UE 705 and a network node 710.

In some cases, the UE 705 may be an application unit (AU) 715, or may include the AU 715. The AU 715 may be any device that is capable of displaying XR content. For example, the AU 715 may be an XR headset. In some cases, the UE 705 may be the RU 720 or may include the RU 720. The RU 720 may include some or all of the features of the RU described above in connection with the aggregated base station or the disaggregated base station of FIG. 3. For example, the RU 720 may be configured to determine one or more radio conditions or to transmit information such as information associated with the XR content. In some cases, the AU 715 and the RU 720 may be included in a single device, such as in the UE 705. In some cases, the AU 715 and the RU 720 may be different devices, or may be included in different devices. For example, the AU 715 may be an XR headset and the RU 720 may be a mobile device such as a cellular telephone.

In some cases, the network node 710 may be the DU 725, may include the DU 725, or may be included in the DU 725. For example, the DU 725 may include some or all of the features of the DU described above in connection with the aggregated base station or the disaggregated base station of FIG. 3. In some cases, the DU 725 may be the base station 110. In some cases, the network node 710 may be the CU 730, may include the CU 730, or may be included in the CU 730. For example, the CU 730 may include some or all of the features of the CU described above in connection with the aggregated base station or the disaggregated base station of FIG. 3. In some cases, the CU 730 may be the core network.

In some cases, the XR may include virtual reality (VR), augmented reality (AR), or mixed reality (MR), or among other examples. In some cases, VR may completely immerse a user in a computer-generated virtual environment. For example, the user may wear a headset that displays the virtual environment and that blocks out (or partially blocks out) the real-world environment. In some cases, AR may overlay computer generated objects onto the real-world environment. For example, the user may view an image of the real-world environment through a cell phone (via a camera and display), and the cell phone may display computer-generated objects in the image of the real-world environment. In some cases, MR may be any combination of VR or AR that mixes the virtual environment (or virtual objects) with the real-world environment (or real-world objects).

In some aspects, the XR may be included as part of an NTN, such as the NTN described above in connection with FIG. 4. For example, the UE 705 (e.g., the AU 715 or the RU 720) may receive XR information from the satellite 420 for XR playback.

In some cases, the AU 715 may be configured to generate an ADU. The ADU may be the minimum (e.g., smallest) unit being sent between the application unit (e.g., the AU 715) and the modem (e.g., the RU 720). In some cases, the frames of the ADU may have different coding mechanisms or different refresh rates than frames of other data units, such as the PDUs described herein.

In some cases, XR traffic may be highly time sensitive and/or highly packet loss sensitive. For example, the XR traffic may be sensitive to jitter. Jitter may be defined as a variance in latency (e.g., a time delay between when a signal is transmitted and when it is received). The variance may be measured in milliseconds (ms). In some cases, the jitter may be constant jitter (e.g., a constant level of packet-to-packet delay variation), transient jitter (e.g., characterized by a gradual delay that may be incurred by a single packet), or short-term delay variation (e.g., an increase in delay that persists for some number of packets and may be accompanied by an increase in packet-to-packet delay variation), among other examples.

In some cases, packet jitter may cause delayed data transmission, poor processing performance, or flickering display monitors, among other examples. For example, excess jitter in cellular communications may impact call quality or video conferencing, even causing conversations to "drop out" or become jumbled and difficult to understand. Some applications and services may have a higher level of tolerance for jitter than other applications and services. For example, jitter may not affect sending emails as much as it may affect a voice chat. In some cases, packets may travel through the network in equal intervals, with a relatively short (e.g., 10 ms) delay between packets. With high jitter, this number could increase to 50 ms, thereby disrupting the intervals and increasing processor complexity.

In some cases, certain measures may be taken to ensure successful delivery of the ADU within stipulated time limits to meet the jitter requirements. For example, the ADU may have some level of FEC information to correct some of the missing bits. When this ADU is transmitted over the network, the ADU may go through various radio protocols to ensure successful delivery, including packetization (e.g., PDCP), segmentation (e.g., RLC), retransmission (e.g., RLC), or redundancy (e.g., automatic repeat request (ARQ) or hybrid automatic repeat request (HARQ)), among other examples.

As described above, FEC may involve transmitting an additional error recovery packet for every n packets that are transmitted. The additional error packet potentially enables the network equipment at the receiving end to reconstitute the lost packet, and may negate the actual packet loss. The ability of the equipment at the receiving end to reconstitute the lost packets depends on how many packets were lost and how many extra packets were transmitted. For example, in the case in which one extra packet is carried for every 10 normal packets (1:10 FEC), a 1% packet loss can be reduced to less than 0.09%. However, carrying extra packets if they are not needed may result in unnecessary overhead.

In some cases, PDCP out-of-order-delivery (OOOD) may be one option given to the PDCP to deliver the packets earlier than in-sequence due to different radio conditions. PDCP OOOD may be described as the delivery of data packets in a different order from which they were sent. PDCP OOOD can be caused by packets following multiple paths through a network, by lower-layer retransmission procedures (e.g., ARQ or HARQ), or via parallel processing paths within network equipment that are not designed to ensure that packet ordering is preserved. In some cases, the packets might be transmitted over different PHY links, different RATs, or different block error rate (BLER) based environments. PDCP OOOD may help to recover the ADU with the help of ADU FEC, if enough PDCP packets are available.

In some cases, the BLER may be described as the ratio of the number of transport blocks received in error to the total number of blocks transmitted over a certain number of frames. This measurement may be performed after channel de-interleaving and decoding by evaluating the cyclic redundancy check (CRC) on each transport block received. In some cases, the BLER may closely reflect on the RF channel conditions and the level of interference. For a given modulation depth, the cleaner the radio channel or higher the signal-to-noise ratio (SNR), the less likely that the transport block is received in error (e.g., indicating a lower BLER).

As described above, the ADU may be the minimum (e.g., smallest) unit being sent between the application unit (e.g., the AU 715) and the modem (e.g., the RU 720). The ADU may be part of the application protocol. In contrast, the amount of FEC that is applied to a packet (e.g., a packet associated with the ADU) may be based at least in part on one or more of the radio characteristics described herein (e.g., BLER or latency). In some cases, the application unit may be unaware of the instantaneous radio characteristics or the underlying radio environment. For example, the application unit may be unaware of the RAT type (e.g., 5G, 4G, Wi-Fi), the RAT bandwidth, the scheduling delays, the loading conditions, or other challenges which can result in varying radio transmission or reception opportunities. Thus, the application unit may not be able to adapt the ADU based at least in part on the radio characteristics. In some cases, this may result in excess overhead. For example, the application unit may apply more FEC to the ADU than is needed, given the current radio characteristics. Similarly, the radio unit may not be aware of the application layer characteristics. Thus, it may not be possible to adjust the radio characteristics based at least in part on the ADU characteristics. This may result in dropped packets or an increased latency resulting from excess packet retransmissions.

Techniques and apparatuses are described herein for ADU FEC adaptation. In some cases, the UE 705 (e.g., the radio unit, such as the RU 720) may obtain FEC information associated with an ADU. The UE 705 may adjust the PDCP characteristic, the RLC characteristic, or the physical layer HARQ characteristic for transmitting a packet based at least in part on the received FEC information. In some cases, the UE 705 (e.g., the application unit, such as the AU 715) may obtain radio information such as PDCP information, RLC information, or physical layer HARQ information. The UE 705 may apply FEC to the ADU based at least in part on the PDCP information, the RLC information, or the physical layer HARQ information.

As described above, applying more FEC to the ADU than is needed, given the current radio characteristics, may result in excess overhead. Similarly, performing packet transmission without knowledge of the FEC information may result in dropped packets or an increased latency resulting from excess packet retransmissions. Using the techniques and apparatuses described herein, the UE may be configured to adjust the FEC based at least in part on the radio characteristics, or to adjust the radio characteristics based at least in part on the FEC, thereby reducing overhead, reducing latency, and reducing excess packet retransmissions, among other benefits.

As indicated above, FIG. 7 is provided as an example. Other examples may differ from what is described with regard to FIG. 7.

Figure 8:
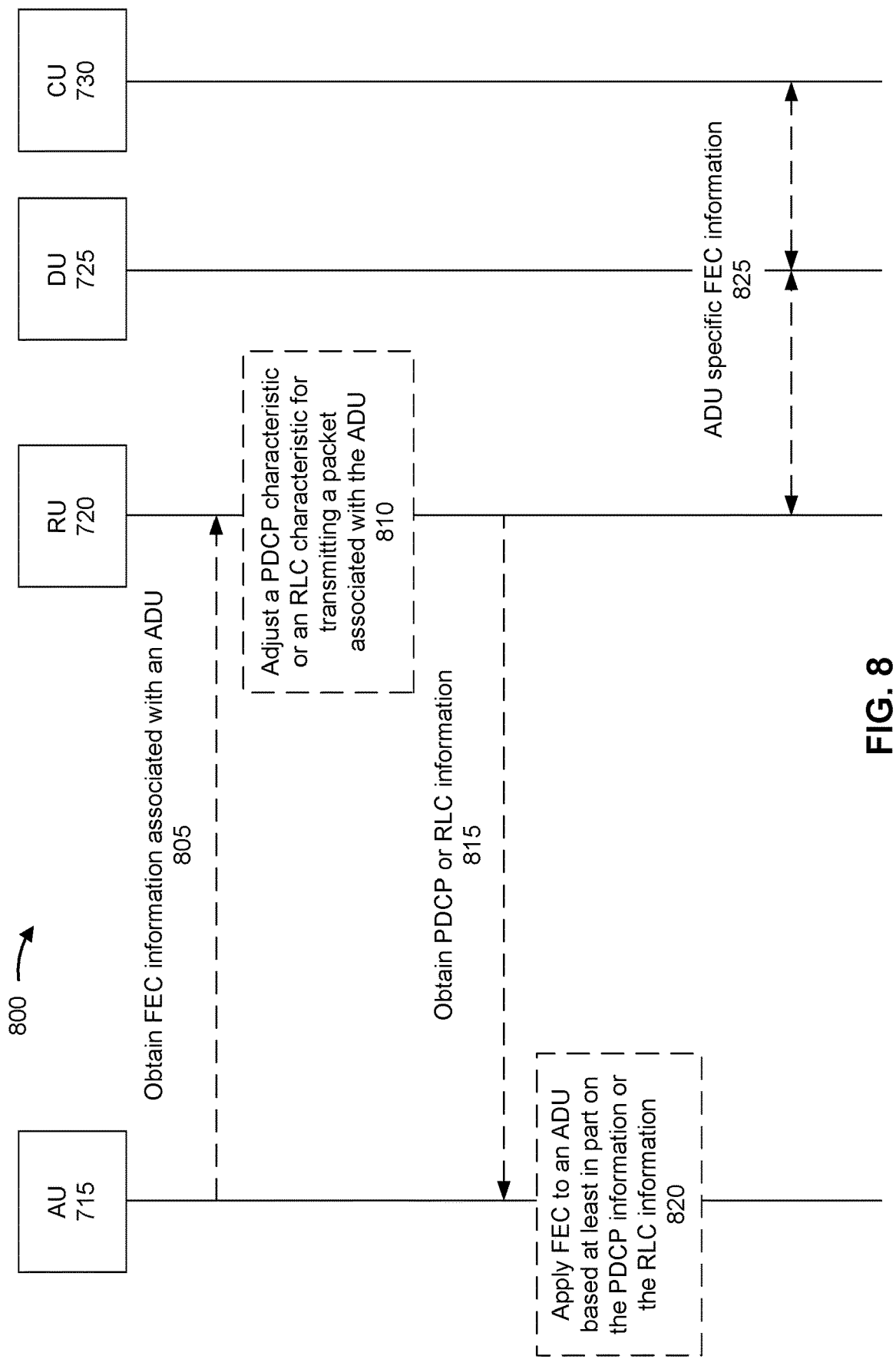
FIG. 8 is a diagram illustrating an example associated with application data unit (ADU) forward error correction (FEC) adaptation, in accordance with the present disclosure.

FIG. 8 is a diagram illustrating an example 800 of ADU FEC adaptation, in accordance with the present disclosure.

As shown in connection with reference number 805, the RU 720 may obtain FEC information associated with an ADU. In some cases, the RU 720 may receive the FEC information from the AU 715. The FEC information may indicate an amount of FEC that is applied to the ADU. For example, the FEC information may indicate that the ADU has a 40% error correction (e.g., redundancy). A 40% error correction may indicate that for every 100 bytes, 40 bytes are reserved for FEC. For example, the 40 bytes may be duplicate bytes. As described above, a receiver device may use the duplicate bytes for decoding packets. For example, the receiver device may be able to fully decode the packets using the redundancy bytes even if only 80% of the packet bytes are received.

As shown in connection with reference number 810, the RU 720 may adjust a PDCP characteristic, an RLC characteristic, or a physical layer HARQ characteristic for transmitting a packet associated with the ADU. In some aspects, the RU 720 may receive the ADU from the AU 715 and may generate one or more packets based at least in part on the ADU. For example, the RU 720 may obtain a 1,000 byte (1 kilobyte) ADU and may generate a number of 100 byte packets based at least in part on the 1,000 byte ADU. The generation of the packets associated with the ADUs may be based at least in part on the radio conditions. For example, certain radio conditions may support large packet sizes, while other radio conditions may only support smaller packet sizes.

In some aspects, the RU 720 may determine the PDCP characteristic, the RLC characteristic, or the physical layer HARQ characteristic based at least in part on the FEC information. For example, the RU 720 may determine or adjust one or more PDCP OOOD triggers based at least in part on the FEC information.

In some aspects, if the FEC information indicates that the error correction is high (e.g., that the ADU includes a high number of redundancy bytes), the PDCP OOOD may be aggressive. For example, if the FEC information indicates a 40% error correction, the PDCP characteristic (e.g., the PDCP OOOD triggers) may be adjusted such that packet transmission may begin after receiving 60% of the packet information (e.g., 60% of the bytes).

In some aspects, if the FEC information indicates that the error correction is low (e.g., that the ADU includes a low number of redundancy bytes), the PDCP OOOD may be conservative. For example, if the FEC information indicates a 20% error correction, the PDCP characteristic (e.g., the PDCP OOOD triggers) may be adjusted such that packet transmission does not begin until 80% of the packet information (e.g., 80% of the bytes) are received.

In some aspects, the RU 720 may be configured to wait for an expiration of a time period prior to transmitting the packets. If a certain amount of information (e.g., a certain number of bytes) is not received prior to the expiration of the time period, retransmission may be requested. However, if the FEC information indicates that the error correction is high, the RU 720 may be aggressive and may begin packet transmission prior to the expiration of the time period (assuming that the minimum number of bytes are received). In contrast, if the FEC information indicates that the error correction is low, the RU 720 may be more conservative. For example, the PDCP OOOD information may indicate that the 60% of the bytes may be enough for packet decoding, but that the RU 720 should wait for additional bytes until the expiration of the time period prior to transmitting the packets. However, once 80% of the bytes are received, the RU 720 may begin transmitting the packets (regardless of whether or not the time period has expired).

In some aspects, the RU 720 may adjust a PDCP duplication or RLC early retransmission based at least in part on the FEC information.

In some aspects, if the FEC information indicates that the error correction is high (e.g., that the ADU includes a high number of redundancy bytes), the amount of PDCP duplication or RLC early retransmission may be reduced. For example, the ADU may be recovered with minor BLER if at least a first number of ADU bytes are received.

In some aspects, if the FEC information indicates that the error correction is low (e.g., that the ADU includes a low number of redundancy bytes), the amount of PDCP duplication or RLC early retransmission may be increased. For example, the ADU may be recovered with moderate BLER if at least a second number of ADU bytes are received.

As shown in connection with reference number 815, the AU 715 may obtain PDCP information, RLC information, or physical layer HARQ information. For example, the AU 715 may receive the PDCP information, the RLC information, or the physical layer HARQ information from the RU 720. The PDCP information, the RLC information, or the physical layer HARQ information may indicate one or more radio characteristics of the RU 720. For example, the PDCP information, the RLC information, or the physical layer HARQ information may indicate the RAT type, RAT conditions, instantaneous BLER, or latency, among other examples.

In some aspects, the AU 715 and/or the RU 720 may obtain information associated with one or more radio characteristics. For example, the AU 715 and/or the RU 720 may obtain information associated with a retransmission count (e.g., a number of times that data has been retransmitted), a frequency of retransmission (e.g., how often the data is retransmitted), timer value information, status mechanism information, segmentation information, concatenation adjustment information, RAT selection information (e.g., RAT type), carrier component selection information, coding rate information, redundancy information (e.g., redundancy value or option), power efficiency, spectral efficiency (e.g., at the PHY level), fast retransmission information, or duplication information, among other examples. The information associated with the one or more radio characteristics may be used to adjust the PDCP characteristic, adjust the RLC characteristic, adjust the PHY HARQ characteristic, or to apply the FEC to the ADU, among other examples.

In some aspects, the AU 715 and/or the RU 720 may obtain information associated with one or more application level FEC characteristics. For example, the AU 715 and/or the RU 720 may obtain information associated with a coding type, a coding rate, redundancy information, or application specific behavior information, among other examples. The information associated with the one or more application level FEC characteristics may be used to adjust the PDCP characteristic, adjust the RLC characteristic, adjust the PHY HARQ characteristic, or to apply the FEC to the ADU, among other examples.

As shown in connection with reference number 820, the AU 715 may apply (e.g., determine or adjust) FEC to the ADU based at least in part on the PDCP information, the RLC information, or the physical layer HARQ information.

In some aspects, if the PDCP OOOD or timer reordering (e.g., for downlink) is happening frequently, the FEC may be increased. For example, if the PDCP OOOD or timer reordering is happening more often than a PDCP OOOD or timer reordering threshold, the amount of error correction for the ADU may be increased. In contrast, if the PDCP OOOD or timer reordering is happening less frequently, the FEC may be decreased. For example, if the PDCP OOOD or timer reordering is happening less often than the PDCP OOOD or timer reordering threshold, the amount of error correction for the ADU may be decreased.

In some aspects, if the BLER (e.g., for downlink) is high, the FEC may be increased. For example, if the BLER is greater than, or greater than or equal to, a BLER threshold, the amount of error correction for the ADU may be increased. In contrast, if the BLER is low, the FEC may be decreased. For example, if the BLER is less than, or less than or equal to, the BLER threshold, the amount of error correction for the ADU may be decreased.

In some aspects, if the downlink latency (e.g., the number of scheduling issues) is high, the FEC may be increased. For example, if the downlink latency is greater than, or greater than or equal to, a downlink latency threshold, the amount of error correction for the ADU may be increased. In contrast, if the downlink latency is low, the FEC may be decreased. For example, if the downlink latency is less than, or less than or equal to the downlink latency threshold, the amount of error correction for the ADU may be decreased.

In some aspects, if the uplink latency (e.g., as indicated by a MAC message, an RLC message, or ARQ/HARQ feedback) is low, the FEC may be decreased. For example, if the uplink latency is less than, or less than or equal to, an uplink latency threshold, the amount of error correction for the ADU may be decreased. In contrast, if the uplink latency is high, the FEC may be increased. For example, if the uplink latency is greater than, or greater than or equal to, the uplink latency threshold, the amount of error correction for the ADU may be increased.

In some aspects, the FEC for the ADU may be determined or adjusted based at least in part on a handover or reselection. For example, the AU 715 may determine or adjust the amount of error correction for the ADU based at least in part on handover or reselection information associated with the handover or reselection. In some aspects, the handover or reselection information may indicate radio measurements (such as a measurement identifier and associated criteria) and/or configuration activity (such as conditional handover and cell reselection information), among other examples.

In some aspects, adjusting the FEC for the ADU based at least in part on the handover or reselection information may include adjusting the FEC for the ADU based at least in part on an inter-CU PDCP reestablishment. In this case, the AU 715 may determine to avoid PDCP recovery. For example, the AU 715 may increase the FEC (e.g., the amount of error correction) for the ADU to improve latency.

In some aspects, adjusting the FEC for the ADU based at least in part on the handover or reselection information may include adjusting the FEC for the ADU based at least in part on an intra-CU PDCP continuation. In this case, the AU 715 may maintain the current FEC (e.g., the amount of error correction) for the ADU.

In some aspects, adjusting the FEC for the ADU based at least in part on the handover or reselection information may include adjusting the burst of data to mitigate the radio change. For example, the AU 715 may increase or decrease the burst of data to minimize latency issues.

As shown in connection with reference number 825, the RU 720, the DU 725, and/or the CU 730 may exchange ADU FEC information. In some aspects, the ADU FEC information may include information for adjusting the FEC for the ADU based at least in part on the one or more radio conditions. In some aspects, the ADU FEC information may include information for adjusting one or more radio conditions based at least in part on the FEC for the ADU. As described herein, the numbering shown in the example 800 does not necessarily indicate an order of the processes that are performed. For example, the ADU FEC information 825 may be exchanged prior to the radio condition adjustment based at least in part on the FEC information (as shown in connection with reference number 805) and/or prior to the FEC adjustment based at least in part on the radio condition information (as shown in connection with reference number 815).

In some aspects, the core network (e.g., the CU 730) may indicate the ADU FEC information as part of the quality of service (QoS) profile, or as part of other information, including but not limited to other QoS information. In some aspects, the core network may generate new information (e.g., ADU specific information or an ADU profile) for indicating the ADU FEC information.

In some aspects, the ADU FEC information may be exchanged between the core network (e.g., the CU 730) and the base station (e.g., the DU 725). For example, the ADU FEC information may be exchanged between the core network and the base station using a next generation application protocol (NGAP). In some aspects, the ADU FEC information may be exchanged between the base station (e.g., the DU 725) and the UE (e.g., the UE 705, such as the RU 720 and/or the AU 715). For example, the ADU FEC information may be exchanged between the base station and the UE using a MAC control element (MAC-CE). For example, the ADU FEC information may be exchanged similar to the codec rate adaptation control element.

As described above, applying more FEC to the ADU than is needed, given the current radio characteristics, may result in excess overhead. Similarly, performing packet transmission without knowledge of the FEC information may result in dropped packets or an increased latency resulting from excess packet retransmissions. Using the techniques and apparatuses described herein, the UE may be configured to adjust the FEC based at least in part on the radio characteristics, or to adjust the radio characteristics based at least in part on the FEC, thereby reducing overhead, reducing latency, and reducing excess packet retransmissions, among other benefits.

As indicated above, FIG. 8 is provided as an example. Other examples may differ from what is described with regard to FIG. 8.

Figure 9:
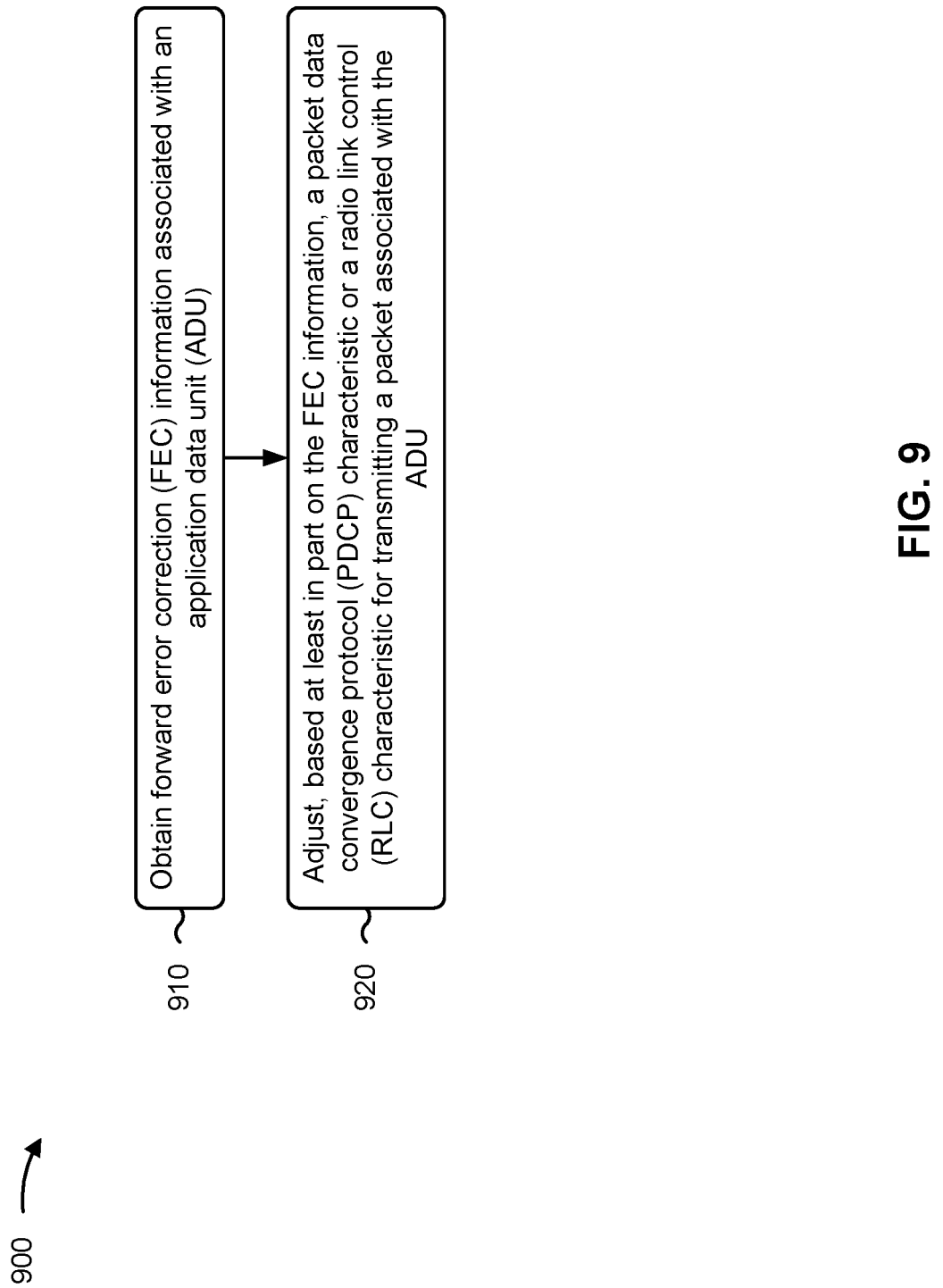
FIG. 9 is a diagram illustrating an example process associated with ADU FEC adaptation, in accordance with the present disclosure.

FIG. 9 is a diagram illustrating an example process 900 performed, for example, by a UE, in accordance with the present disclosure. Example process 900 is an example where the UE (e.g., UE 120) performs operations associated with ADU FEC adaptation.

As shown in FIG. 9, in some aspects, process 900 may include obtaining FEC information associated with an ADU (block 910). For example, the UE (e.g., using communication manager 140 and/or obtaining component 1108, depicted in FIG. 11) may obtain FEC information associated with an ADU, as described above.

As further shown in FIG. 9, in some aspects, process 900 may include adjusting a PDCP characteristic, an RLC characteristic, or a physical layer HARQ characteristic for transmitting a packet associated with the ADU based at least in part on the FEC information (block 920). For example, the UE (e.g., using communication manager 140 and/or adjusting component 1110, depicted in FIG. 11) may adjust a PDCP characteristic, an RLC characteristic, or a physical layer HARQ characteristic for transmitting a packet associated with the ADU based at least in part on the FEC information, as described above.

Process 900 may include additional aspects, such as any single aspect or any combination of aspects described below and/or in connection with one or more other processes described elsewhere herein.

In a first aspect, the FEC information indicates an amount of error correction data that is included in the ADU.

In a second aspect, alone or in combination with the first aspect, adjusting the PDCP characteristic, the RLC characteristic, or the physical layer HARQ characteristic comprises adjusting a PDCP out-of-order delivery (OOOD) threshold for transmitting the packet.

In a third aspect, alone or in combination with one or more of the first and second aspects, adjusting the PDCP OOOD threshold for transmitting the packet comprises decreasing the PDCP OOOD threshold based at least in part on the amount of error correction data being greater than an error correction data threshold.

In a fourth aspect, alone or in combination with one or more of the first through third aspects, adjusting the PDCP OOOD threshold for transmitting the packet comprises increasing the PDCP OOOD threshold based at least in part on the amount of error correction data being less than an error correction data threshold.

In a fifth aspect, alone or in combination with one or more of the first through fourth aspects, adjusting the PDCP characteristic, the RLC characteristic, or the physical layer HARQ characteristic comprises adjusting a number of PDCP duplications or a number of RLC retransmissions.

In a sixth aspect, alone or in combination with one or more of the first through fifth aspects, adjusting the number of PDCP duplications or the number of RLC retransmissions comprises decreasing the number of PDCP duplications or the number of RLC retransmissions based at least in part on the amount of error correction data being greater than an error correction data threshold.

In a seventh aspect, alone or in combination with one or more of the first through sixth aspects, adjusting the number of PDCP duplications or the number of RLC retransmissions comprises increasing the number of PDCP duplications or the number of RLC retransmissions based at least in part on the amount of error correction data being less than an error correction data threshold.

In an eighth aspect, alone or in combination with one or more of the first through seventh aspects, the ADU is an extended reality ADU.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
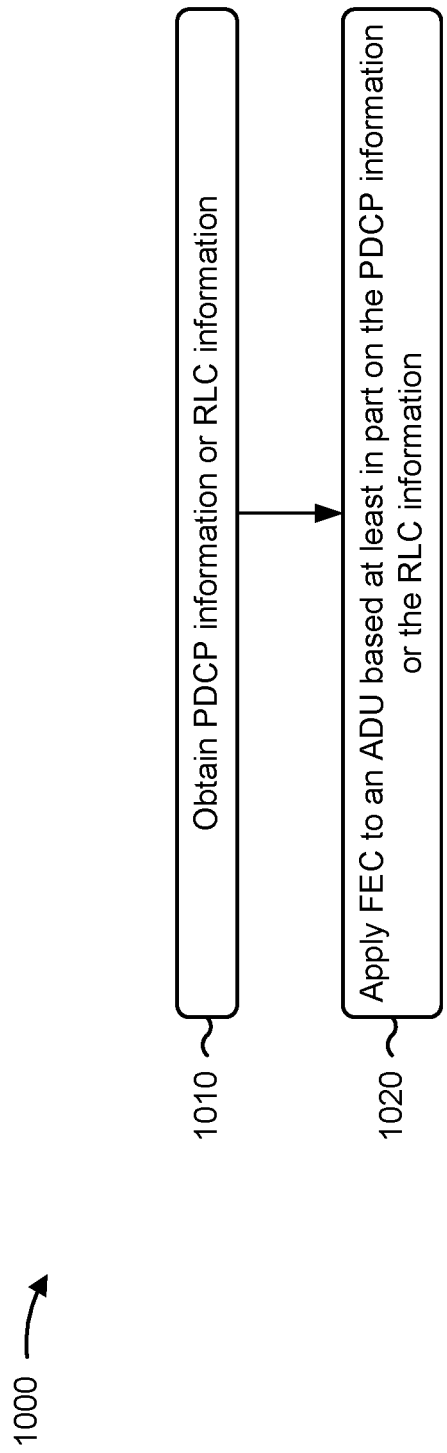
FIG. 10 is a diagram illustrating an example process associated with ADU FEC adaptation, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with ADU FEC adaptation.

As shown in FIG. 10, in some aspects, process 1000 may include obtaining PDCP information, RLC information, or physical layer HARQ information (block 1010). For example, the UE (e.g., using communication manager 140 and/or obtaining component 1108, depicted in FIG. 11) may obtain PDCP information, RLC information, or physical layer HARQ information, as described above.

As further shown in FIG. 10, in some aspects, process 1000 may include applying FEC to an ADU based at least in part on the PDCP information, the RLC information, or the physical layer HARQ information (block 1020). For example, the UE (e.g., using communication manager 140 and/or application component 1112, depicted in FIG. 11) may apply FEC to an ADU based at least in part on the PDCP information, the RLC information, or the physical layer HARQ information, as described above.

Process 1000 may include additional aspects, such as any single aspect or any combination of aspects described below and/or in connection with one or more other processes described elsewhere herein.

In a first aspect, applying the FEC to the ADU based at least in part on the PDCP information, the RLC information, or the physical layer HARQ information comprises applying a first amount of FEC to the ADU based at least in part on the PDCP information, the RLC information, or the physical layer HARQ information indicating that a timer reordering is occurring more often than a timer reordering threshold, or applying a second amount of FEC to the ADU based at least in part on the PDCP information, the RLC information, or the physical layer HARQ information indicating that the timer reordering is occurring less often than the timer reordering threshold, wherein the first amount of FEC is greater than the second amount of FEC.

In a second aspect, alone or in combination with the first aspect, applying the FEC to the ADU based at least in part on the PDCP information, the RLC information, or the physical layer HARQ information comprises applying a first amount of FEC to the ADU based at least in part on the PDCP information, the RLC information, or the physical layer HARQ information indicating that a block error ratio (BLER) is greater than a BLER threshold, or applying a second amount of FEC to the ADU based at least in part on the PDCP information, the RLC information, or the physical layer HARQ information indicating that the BLER is less than the BLER threshold, wherein the first amount of FEC is greater than the second amount of FEC.

In a third aspect, alone or in combination with one or more of the first and second aspects, applying the FEC to the ADU based at least in part on the PDCP information, the RLC information, or the physical layer HARQ information comprises applying a first amount of FEC to the ADU based at least in part on the PDCP information, the RLC information, or the physical layer HARQ information indicating that a latency is greater than a latency threshold, or applying a second amount of FEC to the ADU based at least in part on the PDCP information, the RLC information, or the physical layer HARQ information indicating that the latency is greater than the latency threshold, wherein the first amount of FEC is greater than the second amount of FEC.

In a fourth aspect, alone or in combination with one or more of the first through third aspects, applying the FEC to the ADU based at least in part on the PDCP information, the RLC information, or the physical layer HARQ information comprises determining an amount of FEC data to be applied to the ADU based at least in part on handover or reselection information.

In a fifth aspect, alone or in combination with one or more of the first through fourth aspects, the handover or reselection information comprises a radio measurement or a configuration activity.

In a sixth aspect, alone or in combination with one or more of the first through fifth aspects, determining the amount of FEC data to be applied to the ADU comprises increasing the amount of FEC data to be applied to the ADU based at least in part on an initiation of an inter-central-unit PDCP reestablishment procedure.

In a seventh aspect, alone or in combination with one or more of the first through sixth aspects, determining the amount of FEC data to be applied to the ADU comprises maintaining the amount of FEC data to be applied to the ADU based at least in part on an initiation of an intra-central-unit PDCP continuation procedure.

In an eighth aspect, alone or in combination with one or more of the first through seventh aspects, determining the amount of FEC data to be applied to the ADU comprises adjusting a burst of data.

In a ninth aspect, alone or in combination with one or more of the first through eighth aspects, the ADU is an extended reality ADU.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
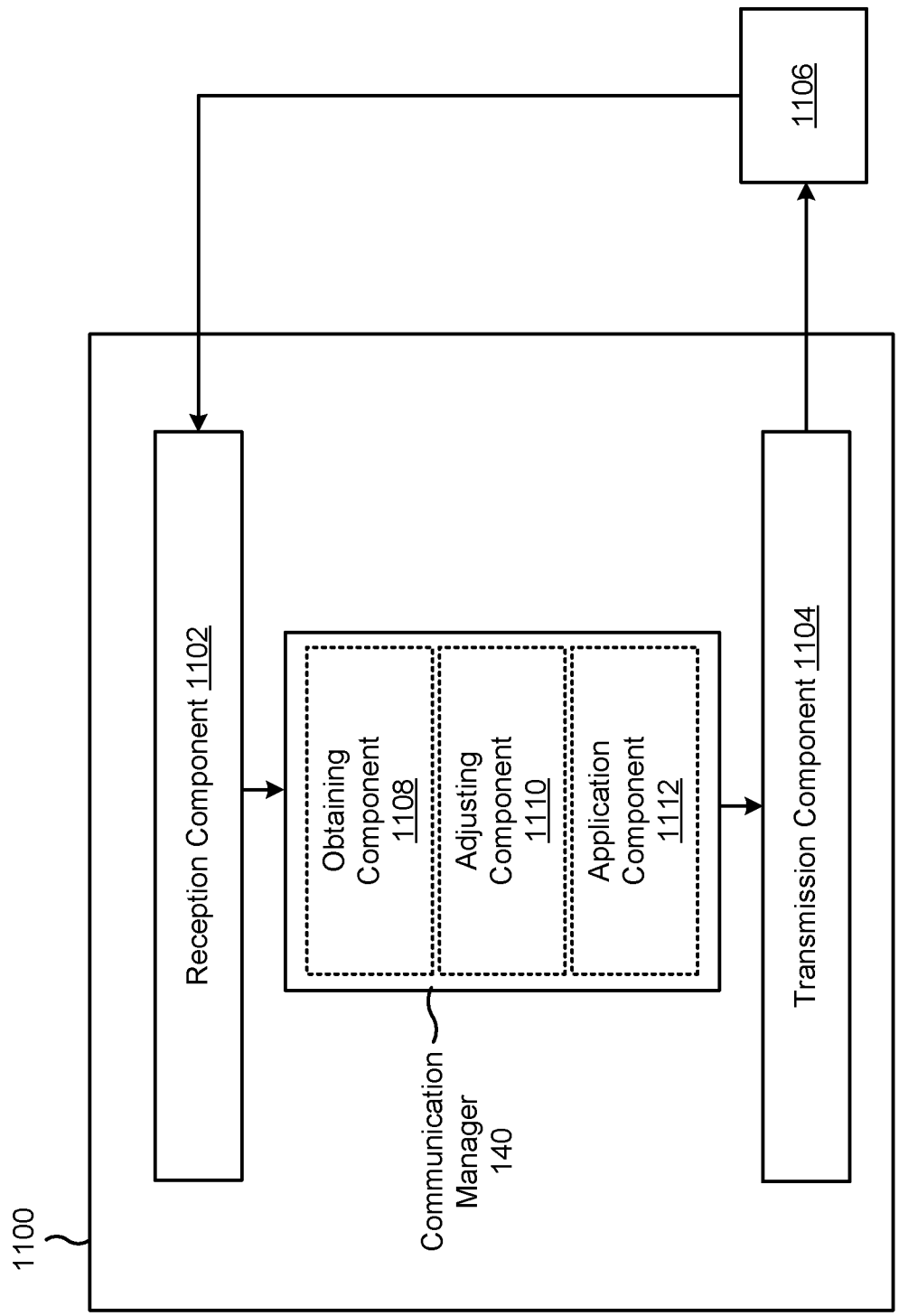
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an obtaining component 1108, an adjusting component 1110, or an application component 1112, among other examples.

As described herein, the AU 715 and the RU 720 may be the same device or may be included in the same device (e.g., the UE 705). In this case, communication manager 140 may be implemented in the UE 705. Alternatively, the AU 715 and the RU 720 may be different devices or may be included in different devices. In this case, the AU 715 and the RU 720 may each be configured with the communication manager 140, or a portion of the communication manager 140 configured to perform some of the functions of the communication manager 140 described herein.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The obtaining component 1108 may obtain FEC information associated with an ADU. The adjusting component 1110 may adjust a PDCP characteristic, an RLC characteristic, or a physical layer HARQ characteristic for transmitting a packet associated with the ADU based at least in part on the FEC information.

The obtaining component 1108 may obtain PDCP information, RLC information, or physical layer HARQ information. The application component 1112 may apply FEC to an ADU based at least in part on the PDCP information, the RLC information, or the physical layer HARQ information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: obtaining forward error correction (FEC) information associated with an application data unit (ADU); and adjusting a packet data convergence protocol (PDCP) characteristic, a radio link control (RLC) characteristic, or a physical layer hybrid automatic repeat request (HARQ) characteristic for transmitting a packet associated with the ADU based at least in part on the FEC information.

Aspect 2: The method of Aspect 1, wherein the FEC information indicates an amount of error correction data that is included in the ADU.

Aspect 3: The method of Aspect 2, wherein adjusting the PDCP characteristic, the RLC characteristic, or the physical layer HARQ characteristic comprises adjusting a PDCP out-of-order delivery (OOOD) threshold for transmitting the packet.

Aspect 4: The method of Aspect 3, wherein adjusting the PDCP OOOD threshold for transmitting the packet comprises decreasing the PDCP OOOD threshold based at least in part on the amount of error correction data being greater than an error correction data threshold.

Aspect 5: The method of Aspect 3, wherein adjusting the PDCP OOOD threshold for transmitting the packet comprises increasing the PDCP OOOD threshold based at least in part on the amount of error correction data being less than an error correction data threshold.

Aspect 6: The method of Aspect 2, wherein adjusting the PDCP characteristic, the RLC characteristic, or the physical layer HARQ characteristic comprises adjusting a number of PDCP duplications or a number of RLC retransmissions.

Aspect 7: The method of Aspect 6, wherein adjusting the number of PDCP duplications or the number of RLC retransmissions comprises decreasing the number of PDCP duplications or the number of RLC retransmissions based at least in part on the amount of error correction data being greater than an error correction data threshold.

Aspect 8: The method of Aspect 6, wherein adjusting the number of PDCP duplications or the number of RLC retransmissions comprises increasing the number of PDCP duplications or the number of RLC retransmissions based at least in part on the amount of error correction data being less than an error correction data threshold.

Aspect 9: The method of any of Aspects 1-8, wherein the ADU is an extended reality ADU.

Aspect 10: A method of wireless communication performed by a user equipment (UE), comprising: obtaining packet data convergence protocol (PDCP) information, radio link control (RLC) information, or physical layer hybrid automatic repeat request (HARQ) information; and applying forward error correction (FEC) to an application data unit (ADU) based at least in part on the PDCP information, the RLC information, or the physical layer HARQ information.

Aspect 11: The method of Aspect 10, wherein applying the FEC to the ADU based at least in part on the PDCP information, the RLC information, or the physical layer HARQ information comprises: applying a first amount of FEC to the ADU based at least in part on the PDCP information, the RLC information, or the physical layer HARQ information indicating that a timer reordering is occurring more often than a timer reordering threshold; or applying a second amount of FEC to the ADU based at least in part on the PDCP information, the RLC information, or the physical layer HARQ information indicating that the timer reordering is occurring less often than the timer reordering threshold, wherein the first amount of FEC is greater than the second amount of FEC.

Aspect 12: The method of any of Aspects 10-11, wherein applying the FEC to the ADU based at least in part on the PDCP information, the RLC information, or the physical layer HARQ information comprises: applying a first amount of FEC to the ADU based at least in part on the PDCP information, the RLC information, or the physical layer HARQ information indicating that a block error ratio (BLER) is greater than a BLER threshold; or applying a second amount of FEC to the ADU based at least in part on the PDCP information, the RLC information, or the physical layer HARQ information indicating that the BLER is less than the BLER threshold, wherein the first amount of FEC is greater than the second amount of FEC.

Aspect 13: The method of any of Aspects 10-12, wherein applying the FEC to the ADU based at least in part on the PDCP information, the RLC information, or the physical layer HARQ information comprises: applying a first amount of FEC to the ADU based at least in part on the PDCP information, the RLC information, or the physical layer HARQ information indicating that a latency is greater than a latency threshold; or applying a second amount of FEC to the ADU based at least in part on the PDCP information, the RLC information, or the physical layer HARQ information indicating that the latency is greater than the latency threshold, wherein the first amount of FEC is greater than the second amount of FEC.

Aspect 14: The method of any of Aspects 10-13, wherein applying the FEC to the ADU based at least in part on the PDCP information, the RLC information, or the physical layer HARQ information comprises determining an amount of FEC data to be applied to the ADU based at least in part on handover or reselection information.

Aspect 15: The method of Aspect 14, wherein the handover or reselection information comprises a radio measurement or a configuration activity.

Aspect 16: The method of Aspect 14, wherein determining the amount of FEC data to be applied to the ADU comprises increasing the amount of FEC data to be applied to the ADU based at least in part on an initiation of an inter-central-unit PDCP reestablishment procedure.

Aspect 17: The method of Aspect 14, wherein determining the amount of FEC data to be applied to the ADU comprises maintaining the amount of FEC data to be applied to the ADU based at least in part on an initiation of an intra-central-unit PDCP continuation procedure.

Aspect 18: The method of Aspect 14, wherein determining the amount of FEC data to be applied to the ADU comprises adjusting a burst of data.

Aspect 19: The method of any of Aspects 10-18, wherein the ADU is an extended reality ADU.

Aspect 20: An apparatus for wireless communication at a device, comprising a processor; memory coupled with the processor; and instructions stored in the memory and executable by the processor to cause the apparatus to perform the method of one or more of Aspects 1-9.

Aspect 21: A device for wireless communication, comprising a memory and one or more processors coupled to the memory, the one or more processors configured to perform the method of one or more of Aspects 1-9.

Aspect 22: An apparatus for wireless communication, comprising at least one means for performing the method of one or more of Aspects 1-9.

Aspect 23: A non-transitory computer-readable medium storing code for wireless communication, the code comprising instructions executable by a processor to perform the method of one or more of Aspects 1-9.

Aspect 24: A non-transitory computer-readable medium storing a set of instructions for wireless communication, the set of instructions comprising one or more instructions that, when executed by one or more processors of a device, cause the device to perform the method of one or more of Aspects 1-9.

Aspect 25: An apparatus for wireless communication at a device, comprising a processor; memory coupled with the processor; and instructions stored in the memory and executable by the processor to cause the apparatus to perform the method of one or more of Aspects 10-19.

Aspect 26: A device for wireless communication, comprising a memory and one or more processors coupled to the memory, the one or more processors configured to perform the method of one or more of Aspects 10-19.

Aspect 27: An apparatus for wireless communication, comprising at least one means for performing the method of one or more of Aspects 10-19.

Aspect 28: A non-transitory computer-readable medium storing code for wireless communication, the code comprising instructions executable by a processor to perform the method of one or more of Aspects 10-19.

Aspect 29: A non-transitory computer-readable medium storing a set of instructions for wireless communication, the set of instructions comprising one or more instructions that, when executed by one or more processors of a device, cause the device to perform the method of one or more of Aspects 10-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
obtain forward error correction (FEC) information associated with an application data unit (ADU), wherein the FEC information indicates an amount of error correction data that is included in the ADU;
adjust, based at least in part on the FEC information, a packet data convergence protocol (PDCP) characteristic, a radio link control (RLC) characteristic, or a physical layer hybrid automatic repeat request (HARQ) characteristic for transmitting a packet associated with the ADU; and
provide PDCP information associated with the PDCP characteristic, RLC information associated with the RLC characteristic, or physical layer HARQ information associated with the physical layer HARQ characteristic.

2. The apparatus of claim 1, wherein the one or more processors, to adjust the PDCP characteristic, the RLC characteristic, or the physical layer HARQ characteristic, are configured to adjust a PDCP out-of-order delivery (OOOD) threshold for transmitting the packet.

3. The apparatus of claim 2, wherein the one or more processors, to adjust the PDCP OOOD threshold for transmitting the packet, are configured to decrease the PDCP OOOD threshold based at least in part on the amount of error correction data being greater than an error correction data threshold.

4. The apparatus of claim 2, wherein the one or more processors, to adjust the PDCP OOOD threshold for transmitting the packet, are configured to increase the PDCP OOOD threshold based at least in part on the amount of error correction data being less than an error correction data threshold.

5. The apparatus of claim 1, wherein the one or more processors, to adjust the PDCP characteristic, the RLC characteristic, or the physical layer HARQ characteristic, are configured to adjust a number of PDCP duplications or a number of RLC retransmissions.

6. The apparatus of claim 5, wherein the one or more processors, to adjust the number of PDCP duplications or the number of RLC retransmissions, are configured to decrease the number of PDCP duplications or the number of RLC retransmissions based at least in part on the amount of error correction data being greater than an error correction data threshold.

7. The apparatus of claim 5, wherein the one or more processors, to adjust the number of PDCP duplications or the number of RLC retransmissions, are configured to increase the number of PDCP duplications or the number of RLC retransmissions based at least in part on the amount of error correction data being less than an error correction data threshold.

8. The apparatus of claim 1, wherein the ADU is an extended reality ADU.

9. An apparatus for wireless communication at a user equipment (UE), comprising:
one or more memories; and
one or more processors, coupled to the one or more memories, configured to:
provide forward error correction (FEC) information associated with an application data unit (ADU), wherein the FEC information indicates an amount of error correction data that is included in the ADU;
obtain, based at least in part on providing the FEC information, packet data convergence protocol (PDCP) information associated with a PDCP characteristic, radio link control (RLC) information associated with an RLC characteristic, or physical layer hybrid automatic repeat request (HARQ) information associated with a physical layer HARQ characteristic; and
apply FEC to the ADU based at least in part on the PDCP information, the RLC information, or the physical layer HARQ information.

10. The apparatus of claim 9, wherein the one or more processors, to apply the FEC to the ADU based at least in part on the PDCP information, the RLC information, or the physical layer HARQ information, are configured to:
apply a first amount of FEC to the ADU based at least in part on the PDCP information, the RLC information, or the physical layer HARQ information indicating that a timer reordering is occurring more often than a timer reordering threshold; or
apply a second amount of FEC to the ADU based at least in part on the PDCP information, the RLC information, or the physical layer HARQ information indicating that the timer reordering is occurring less often than the timer reordering threshold,
wherein the first amount of FEC is greater than the second amount of FEC.

11. The apparatus of claim 9, wherein the one or more processors, to apply the FEC to the ADU based at least in part on the PDCP information, the RLC information, or the physical layer HARQ information, are configured to:
apply a first amount of FEC to the ADU based at least in part on the PDCP information, the RLC information, or the physical layer HARQ information indicating that a block error ratio (BLER) is greater than a BLER threshold; or
apply a second amount of FEC to the ADU based at least in part on the PDCP information, the RLC information, or the physical layer HARQ information indicating that the BLER is less than the BLER threshold,
wherein the first amount of FEC is greater than the second amount of FEC.

12. The apparatus of claim 9, wherein the one or more processors, to apply the FEC to the ADU based at least in part on the PDCP information, the RLC information, or the physical layer HARQ information, are configured to:
  apply a first amount of FEC to the ADU based at least in part on the PDCP information, the RLC information, or the physical layer HARQ information indicating that a latency is greater than a latency threshold; or
  apply a second amount of FEC to the ADU based at least in part on the PDCP information, the RLC information, or the physical layer HARQ information indicating that the latency is greater than the latency threshold,
    wherein the first amount of FEC is greater than the second amount of FEC.

13. The apparatus of claim 9, wherein the one or more processors, to apply the FEC to the ADU based at least in part on the PDCP information, the RLC information, or the physical layer HARQ information, are configured to determine an amount of FEC data to be applied to the ADU based at least in part on handover or reselection information.

14. The apparatus of claim 13, wherein the handover or reselection information comprises a radio measurement or a configuration activity.

15. The apparatus of claim 13, wherein the one or more processors, to determine the amount of FEC data to be applied to the ADU, are configured to increase the amount of FEC data to be applied to the ADU based at least in part on an initiation of an inter-central-unit PDCP reestablishment procedure.

16. The apparatus of claim 13, wherein the one or more processors, to determine the amount of FEC data to be applied to the ADU, are configured to maintain the amount of FEC data to be applied to the ADU based at least in part on an initiation of an intra-central-unit PDCP continuation procedure.

17. The apparatus of claim 13, wherein the one or more processors, to determine the amount of FEC data to be applied to the ADU, are configured to adjust a burst of data.

18. The apparatus of claim 9, wherein the ADU is an extended reality ADU.

19. A method of wireless communication performed by a user equipment (UE), comprising:
  obtaining forward error correction (FEC) information associated with an application data unit (ADU), wherein the FEC information indicates an amount of error correction data that is included in the ADU;
  adjusting, based at least in part on the FEC information, a packet data convergence protocol (PDCP) characteristic, a radio link control (RLC) characteristic, or a physical layer hybrid automatic repeat request (HARQ) characteristic for transmitting a packet associated with the ADU; and
  providing PDCP information associated with the PDCP characteristic, RLC information associated with the RLC characteristic, or physical layer HARQ information associated with the physical layer HARQ characteristic.

20. The method of claim 19, wherein adjusting the PDCP characteristic, the RLC characteristic, or the physical layer HARQ characteristic comprises adjusting a PDCP out-of-order delivery (OOOD) threshold for transmitting the packet.

21. The method of claim 20, wherein adjusting the PDCP OOOD threshold for transmitting the packet comprises decreasing the PDCP OOOD threshold based at least in part on the amount of error correction data being greater than an error correction data threshold.

22. The method of claim 20, wherein adjusting the PDCP OOOD threshold for transmitting the packet comprises increasing the PDCP OOOD threshold based at least in part on the amount of error correction data being less than an error correction data threshold.

23. The method of claim 19, wherein adjusting the PDCP characteristic, the RLC characteristic, or the physical layer HARQ characteristic comprises adjusting a number of PDCP duplications or a number of RLC retransmissions.

24. The method of claim 23, wherein adjusting the number of PDCP duplications or the number of RLC retransmissions comprises decreasing the number of PDCP duplications or the number of RLC retransmissions based at least in part on the amount of error correction data being greater than an error correction data threshold.

25. The method of claim 23, wherein adjusting the number of PDCP duplications or the number of RLC retransmissions comprises increasing the number of PDCP duplications or the number of RLC retransmissions based at least in part on the amount of error correction data being less than an error correction data threshold.

26. The method of claim 19, wherein the ADU is an extended reality ADU.

27. A method of wireless communication performed by a user equipment (UE), comprising:
  providing forward error correction (FEC) information associated with an application data unit (ADU), wherein the FEC information indicates an amount of error correction data that is included in the ADU;
  obtaining, based at least in part on providing the FEC information, packet data convergence protocol (PDCP) information associated with a PDCP characteristic, radio link control (RLC) information associated with an RLC characteristic, or physical layer hybrid automatic repeat request (HARQ) information associated with a physical layer HARQ characteristic; and
  applying FEC to the ADU based at least in part on the PDCP information, the RLC information, or the physical layer HARQ information.

28. The method of claim 27, wherein applying the FEC to the ADU based at least in part on the PDCP information, the RLC information, or the physical layer HARQ information comprises:
  applying a first amount of FEC to the ADU based at least in part on the PDCP information, the RLC information, or the physical layer HARQ information indicating that a timer reordering is occurring more often than a timer reordering threshold; or
  applying a second amount of FEC to the ADU based at least in part on the PDCP information, the RLC information, or the physical layer HARQ information indicating that the timer reordering is occurring less often than the timer reordering threshold,
    wherein the first amount of FEC is greater than the second amount of FEC.

29. The method of claim 27, wherein applying the FEC to the ADU based at least in part on the PDCP information, the RLC information, or the physical layer HARQ information comprises:
  applying a first amount of FEC to the ADU based at least in part on the PDCP information, the RLC information, or the physical layer HARQ information indicating that a block error ratio (BLER) is greater than a BLER threshold; or
  applying a second amount of FEC to the ADU based at least in part on the PDCP information, the RLC information, or the physical layer HARQ information indicating that the BLER is less than the BLER threshold, wherein the first amount of FEC is greater than the second amount of FEC.

30. The method of claim 27, wherein applying the FEC to the ADU based at least in part on the PDCP information, the RLC information, or the physical layer HARQ information comprises:

applying a first amount of FEC to the ADU based at least in part on the PDCP information, the RLC information, or the physical layer HARQ information indicating that a latency is greater than a latency threshold; or applying a second amount of FEC to the ADU based at least in part on the PDCP information, the RLC information, or the physical layer HARQ information indicating that the latency is greater than the latency threshold, wherein the first amount of FEC is greater than the second amount of FEC.

\* \* \* \* \*